US012135789B2

(12) United States Patent
Labreche

(10) Patent No.: US 12,135,789 B2
(45) Date of Patent: Nov. 5, 2024

(54) SYSTEMS AND METHODS OF ATTACK TYPE AND LIKELIHOOD PREDICTION

(71) Applicant: Secureworks Corp., Wilmington, DE (US)

(72) Inventor: Francois Labreche, Montreal (CA)

(73) Assignee: Secureworks Corp., Wilmington, DE (US)

( * ) Notice: Subject to any disclaimer, the term of this patent is extended or adjusted under 35 U.S.C. 154(b) by 495 days.

(21) Appl. No.: 17/393,669

(22) Filed: Aug. 4, 2021

(65) Prior Publication Data
US 2023/0038196 A1 Feb. 9, 2023

(51) Int. Cl.
G06F 21/57 (2013.01)
G06N 20/00 (2019.01)

(52) U.S. Cl.
CPC .......... G06F 21/577 (2013.01); G06N 20/00 (2019.01); *G06F 2221/034* (2013.01)

(58) Field of Classification Search
CPC .. G06F 21/577; G06F 2221/034; G06N 20/00
See application file for complete search history.

(56) References Cited

U.S. PATENT DOCUMENTS

| 5,937,066 A | 8/1999 | Gennaro et al. |
| 6,357,010 B1 | 3/2002 | Viets et al. |
| 7,269,578 B2 | 9/2007 | Sweeney |

(Continued)

FOREIGN PATENT DOCUMENTS

| EP | 3599753 A1 | 1/2020 |
| RU | 2738344 C1 | 12/2020 |

(Continued)

OTHER PUBLICATIONS

Sabottke, Carl, Suciu, Octavian and Dumitras, Tudor; "Vulnerability Disclosure in the Age of Social Media: Exploiting Twitter for Predicting Real-World Exploits"; 24th USENIX Security Symposium; Aug. 12-14, 2015, Washington, D.C. ; USENIX Association; 2015.

(Continued)

*Primary Examiner* — Aravind K Moorthy
(74) *Attorney, Agent, or Firm* — Womble Bond Dickinson (US) LLP

(57) ABSTRACT

The present disclosure provides systems and methods for predicting attack types and likelihood the attack types will occur for new vulnerabilities. According to the present disclosure, the method includes receiving a disclosure of a new vulnerability, the disclosure comprising a plurality of vulnerability details. The method includes developing a series of vulnerability features associated with the details of the new vulnerability. The method includes extracting each of the vulnerability features into intermediate inputs. The method includes providing each of the intermediate inputs to one or more attack type classifiers to thereby determine if an attack type is associated with the new vulnerability. The method includes determining ranking for each of the one or more attacks occurring for the new vulnerability. The method finally includes assigning one or more attack type labels to the new vulnerability based on each attack type associated with the new vulnerability. Other aspects are also described.

19 Claims, 9 Drawing Sheets

(56) References Cited

U.S. PATENT DOCUMENTS

| | | | |
|---|---|---|---|
| 7,331,061 B1 | 2/2008 | Ramsey et al. | |
| 7,492,957 B1 | 2/2009 | Bonhaus | |
| 7,548,932 B2 | 6/2009 | Horvitz et al. | |
| 7,555,482 B2 | 6/2009 | Korkus | |
| 7,571,474 B2 | 8/2009 | Ross et al. | |
| 7,594,270 B2 | 9/2009 | Church et al. | |
| 7,606,801 B2 | 10/2009 | Faitelson et al. | |
| 7,613,722 B2 | 11/2009 | Horvitz et al. | |
| 7,770,031 B2 | 8/2010 | MacKay et al. | |
| 7,841,008 B1* | 11/2010 | Cole | G06F 21/577 726/25 |
| 7,856,411 B2 | 12/2010 | Darr | |
| 7,926,113 B1 | 4/2011 | Gula et al. | |
| 8,037,529 B1* | 10/2011 | Chiueh | G06F 11/3604 713/188 |
| 8,079,081 B1 | 12/2011 | Lavrik et al. | |
| 8,082,506 B1* | 12/2011 | McConnell | H04L 63/1433 715/734 |
| 8,122,495 B2 | 2/2012 | Ramsey et al. | |
| 8,156,553 B1 | 4/2012 | Church et al. | |
| 8,327,419 B1 | 12/2012 | Korablev et al. | |
| 8,407,335 B1 | 3/2013 | Church et al. | |
| 8,490,193 B2 | 7/2013 | Sarraute et al. | |
| 8,490,196 B2 | 7/2013 | Lucangeli et al. | |
| 8,522,350 B2 | 8/2013 | Davenport et al. | |
| 8,539,575 B2 | 9/2013 | Schmitlin et al. | |
| 8,578,393 B1 | 11/2013 | Fisher | |
| 8,595,170 B2 | 11/2013 | Gladstone et al. | |
| 8,621,618 B1 | 12/2013 | Ramsey et al. | |
| 8,701,176 B2 | 4/2014 | Ramsey et al. | |
| 8,793,786 B2 | 7/2014 | Bhesania et al. | |
| 8,805,881 B2 | 8/2014 | Hom et al. | |
| 8,832,048 B2 | 9/2014 | Lim | |
| 8,839,414 B2 | 9/2014 | Mantle et al. | |
| 8,898,777 B1 | 11/2014 | Oliver | |
| 8,909,673 B2 | 12/2014 | Faitelson et al. | |
| 8,931,095 B2 | 1/2015 | Ramsey et al. | |
| 8,938,802 B2 | 1/2015 | Davenport et al. | |
| 8,959,115 B2 | 2/2015 | Marathe | |
| 8,984,644 B2 | 3/2015 | Oliphant et al. | |
| 9,009,828 B1 | 4/2015 | Ramsey et al. | |
| 9,032,478 B2 | 5/2015 | Ballesteros et al. | |
| 8,928,476 B2 | 6/2015 | Jerhotova et al. | |
| 9,046,886 B2 | 6/2015 | Chong et al. | |
| 9,047,336 B2 | 6/2015 | Hom et al. | |
| 9,058,492 B1* | 6/2015 | Satish | G06F 21/57 |
| 9,069,599 B2 | 6/2015 | Martinez et al. | |
| 9,098,702 B2 | 8/2015 | Rubin et al. | |
| 9,129,105 B2 | 9/2015 | Donley et al. | |
| 9,130,988 B2 | 9/2015 | Seifert et al. | |
| 9,137,262 B2 | 9/2015 | Qureshi et al. | |
| 9,191,400 B1 | 11/2015 | Ptasinski et al. | |
| 9,195,809 B1* | 11/2015 | Kaplan | G06F 21/577 |
| 9,275,231 B1* | 3/2016 | Chen | G06F 21/564 |
| 9,298,895 B2 | 3/2016 | Lim | |
| 9,319,426 B2 | 4/2016 | Webb et al. | |
| 9,338,134 B2 | 5/2016 | Yin | |
| 9,338,180 B2 | 5/2016 | Ramsey et al. | |
| 9,430,534 B2 | 8/2016 | Bhattacharya et al. | |
| 9,438,563 B2 | 9/2016 | Yin | |
| 9,438,623 B1* | 9/2016 | Thioux | G06F 21/52 |
| 9,519,756 B2 | 12/2016 | Bitran et al. | |
| 9,544,273 B2 | 1/2017 | Fleury et al. | |
| 9,548,994 B2 | 1/2017 | Pearcy et al. | |
| 9,558,352 B1 | 1/2017 | Dennison et al. | |
| 9,560,062 B2 | 1/2017 | Khatri et al. | |
| 9,560,068 B2 | 1/2017 | Figlin et al. | |
| 9,596,252 B2 | 3/2017 | Coates et al. | |
| 9,628,511 B2 | 4/2017 | Ramsey et al. | |
| 9,667,656 B2 | 5/2017 | Banerjee et al. | |
| 9,667,661 B2 | 5/2017 | Sharma et al. | |
| 9,690,938 B1 | 6/2017 | Saxe et al. | |
| 9,710,672 B2 | 7/2017 | Braun | |
| 9,712,549 B2 | 7/2017 | Almurayh | |
| 9,742,559 B2 | 8/2017 | Christodorescu et al. | |
| 9,767,302 B2 | 9/2017 | Lim | |
| 9,792,443 B1* | 10/2017 | Sheridan | G06F 21/563 |
| 9,805,202 B2 | 10/2017 | Medeiros et al. | |
| 9,825,989 B1* | 11/2017 | Mehra | H04L 63/145 |
| 9,910,986 B1 | 3/2018 | Saxe | |
| 9,934,376 B1* | 4/2018 | Ismael | G06F 21/566 |
| 9,973,524 B2 | 5/2018 | Boyer et al. | |
| 9,998,480 B1* | 6/2018 | Gates | G06F 21/577 |
| 10,038,706 B2* | 7/2018 | Mekky | H04L 63/1433 |
| 10,050,992 B2 | 8/2018 | Thyni et al. | |
| 10,063,582 B1 | 8/2018 | Feng et al. | |
| 10,114,954 B1* | 10/2018 | Bellis | G06F 21/577 |
| 10,116,500 B1 | 10/2018 | Long et al. | |
| 10,218,733 B1* | 2/2019 | Amidon | H04L 63/1425 |
| 10,270,790 B1 | 4/2019 | Jackson | |
| 10,277,625 B1* | 4/2019 | Efstathopoulos | H04L 63/1433 |
| 10,311,231 B1 | 6/2019 | Kayyoor et al. | |
| 10,348,747 B2* | 7/2019 | Yamada | G06F 16/951 |
| 10,356,125 B2 | 7/2019 | Goutal et al. | |
| 10,382,473 B1* | 8/2019 | Ashkenazy | H04L 63/1466 |
| 10,382,489 B2 | 8/2019 | Das et al. | |
| 10,419,903 B2 | 9/2019 | Singh et al. | |
| 10,425,223 B2 | 9/2019 | Roth et al. | |
| 10,454,950 B1* | 10/2019 | Aziz | H04L 63/1425 |
| 10,474,813 B1* | 11/2019 | Ismael | G06F 21/54 |
| 10,474,820 B2 | 11/2019 | Manadhata | |
| 10,491,632 B1 | 11/2019 | Natarajan et al. | |
| 10,521,584 B1* | 12/2019 | Sharifi Mehr | H04L 63/1433 |
| 10,558,809 B1* | 2/2020 | Joyce | G06N 5/046 |
| 10,567,407 B2 | 2/2020 | Tang et al. | |
| 10,594,713 B2 | 3/2020 | McLean | |
| 10,601,865 B1 | 3/2020 | Mesdaq et al. | |
| 10,642,753 B1* | 5/2020 | Steinberg | G06F 21/56 |
| 10,691,810 B1* | 6/2020 | Freitag | G06F 8/71 |
| 10,726,127 B1* | 7/2020 | Steinberg | G06F 21/566 |
| 10,728,263 B1 | 7/2020 | Neumann | |
| 10,735,470 B2 | 8/2020 | Vidas et al. | |
| 10,754,958 B1* | 8/2020 | Sidagni | G06F 21/552 |
| 10,762,206 B2 | 9/2020 | Titonis et al. | |
| 10,785,238 B2 | 9/2020 | McLean et al. | |
| 10,834,128 B1 | 11/2020 | Rajogopalan et al. | |
| 10,841,337 B2 | 11/2020 | Kinder | |
| 10,853,431 B1 | 12/2020 | Lin et al. | |
| 10,855,717 B1* | 12/2020 | Feiman | G06F 21/57 |
| 10,868,825 B1* | 12/2020 | Dominessy | H04L 43/045 |
| 10,915,828 B2 | 2/2021 | Qhi | |
| 10,944,758 B1* | 3/2021 | Nagargadde | G06F 21/6218 |
| 11,003,718 B2 | 5/2021 | McLean et al. | |
| 11,038,920 B1* | 6/2021 | Sellers | H04L 63/1433 |
| 11,044,263 B2 | 6/2021 | McLean et al. | |
| 11,113,086 B1* | 9/2021 | Steinberg | G06F 9/45558 |
| 11,140,193 B2* | 10/2021 | Patel | G06F 21/577 |
| 11,165,862 B2 | 11/2021 | Austin et al. | |
| 11,275,831 B1 | 3/2022 | Aouad et al. | |
| 11,552,979 B1* | 1/2023 | Soudhamma | H04L 45/22 |
| 11,562,076 B2* | 1/2023 | El-Moussa | H04L 63/1466 |
| 11,693,972 B2* | 7/2023 | Nunes | G06F 16/9536 726/25 |
| 11,757,907 B1* | 9/2023 | Berger | H04L 63/1425 726/23 |
| 11,863,577 B1* | 1/2024 | Miseiko | G06F 9/45558 |
| 2002/0129135 A1 | 9/2002 | Delany et al. | |
| 2002/0199122 A1* | 12/2002 | Davis | G06F 21/577 726/25 |
| 2004/0128543 A1* | 7/2004 | Blake | H04L 63/1491 709/224 |
| 2005/0015382 A1* | 1/2005 | Aaron | H04L 63/0227 |
| 2005/0060295 A1 | 3/2005 | Gould et al. | |
| 2005/0138204 A1 | 6/2005 | Iyer et al. | |
| 2005/0138413 A1* | 6/2005 | Lippmann | G06F 21/577 726/4 |
| 2005/0166072 A1* | 7/2005 | Converse | H04L 63/1441 726/5 |
| 2005/0288939 A1 | 12/2005 | Peled et al. | |
| 2006/0012815 A1 | 1/2006 | Ebner et al. | |
| 2006/0021046 A1* | 1/2006 | Cook | G06F 21/577 726/25 |

(56) References Cited

U.S. PATENT DOCUMENTS

| | | |
|---|---|---|
| 2006/0021048 A1* | 1/2006 | Cook .................. H04L 63/1433 726/25 |
| 2006/0037076 A1 | 2/2006 | Roy |
| 2006/0195575 A1 | 8/2006 | Delany et al. |
| 2006/0253447 A1 | 11/2006 | Judge |
| 2007/0067848 A1* | 3/2007 | Gustave ................ G06F 21/577 726/25 |
| 2007/0143852 A1* | 6/2007 | Keanini .............. H04L 63/1416 726/25 |
| 2007/0169199 A1* | 7/2007 | Quinnell ............. H04L 63/1433 726/25 |
| 2007/0192867 A1 | 8/2007 | Miliefsky |
| 2007/0226248 A1 | 9/2007 | Darr |
| 2007/0226807 A1 | 9/2007 | Ginter et al. |
| 2007/0294756 A1* | 12/2007 | Fetik ..................... G06F 21/552 726/11 |
| 2008/0077593 A1 | 3/2008 | Abrams et al. |
| 2008/0219334 A1 | 9/2008 | Brainos et al. |
| 2008/0255997 A1 | 10/2008 | Bluhm et al. |
| 2008/0262991 A1 | 10/2008 | Kapoor |
| 2008/0301798 A1* | 12/2008 | Hao .................... H04L 63/0227 726/13 |
| 2008/0320000 A1 | 12/2008 | Gaddam |
| 2009/0038015 A1* | 2/2009 | Diamant ............. H04L 63/1433 726/25 |
| 2009/0113550 A1* | 4/2009 | Costa ..................... G06F 21/55 726/25 |
| 2009/0198682 A1 | 8/2009 | Buehler et al. |
| 2010/0083374 A1 | 4/2010 | Schmitlin et al. |
| 2010/0125913 A1 | 5/2010 | Davenport et al. |
| 2010/0251329 A1 | 9/2010 | Wei et al. |
| 2011/0004771 A1 | 1/2011 | Matsushima et al. |
| 2011/0179492 A1 | 7/2011 | Markopoulou et al. |
| 2011/0197056 A1* | 8/2011 | Chen ................... H04L 63/0428 713/150 |
| 2011/0276604 A1 | 11/2011 | Hom et al. |
| 2011/0276716 A1 | 11/2011 | Coulson |
| 2012/0072983 A1 | 3/2012 | McCusker et al. |
| 2012/0117640 A1 | 5/2012 | Ramsey et al. |
| 2012/0185275 A1 | 7/2012 | Loghmani |
| 2012/0222122 A1* | 8/2012 | Das ...................... G06F 21/577 726/25 |
| 2012/0233699 A1* | 9/2012 | Jajodia ................ H04L 63/1433 726/25 |
| 2012/0246730 A1 | 9/2012 | Raad |
| 2012/0254333 A1 | 10/2012 | Chandramouli |
| 2012/0260341 A1 | 10/2012 | Chan et al. |
| 2013/0104191 A1 | 4/2013 | Peled et al. |
| 2013/0138428 A1 | 5/2013 | Chandramouli |
| 2013/0173620 A1 | 7/2013 | Takenouchi |
| 2013/0226938 A1 | 8/2013 | Risher et al. |
| 2013/0238319 A1 | 9/2013 | Minegishi et al. |
| 2013/0282746 A1 | 10/2013 | Balko et al. |
| 2013/0291103 A1 | 10/2013 | Davenport et al. |
| 2013/0318604 A1 | 11/2013 | Coates et al. |
| 2014/0041028 A1 | 2/2014 | Ramsey et al. |
| 2014/0047544 A1 | 2/2014 | Jakobsson |
| 2014/0047545 A1* | 2/2014 | Sidagni ................ G06F 21/577 726/25 |
| 2014/0051432 A1 | 2/2014 | Gupta et al. |
| 2014/0137257 A1* | 5/2014 | Martinez ............. H04L 63/1433 726/25 |
| 2014/0143863 A1 | 5/2014 | Deb et al. |
| 2014/0165195 A1 | 6/2014 | Brdiczka et al. |
| 2014/0165204 A1* | 6/2014 | Williams ................ G06F 21/55 726/25 |
| 2014/0181981 A1* | 6/2014 | Christodorescu ....... G06F 21/54 726/25 |
| 2014/0222712 A1 | 8/2014 | Samaha et al. |
| 2014/0283081 A1* | 9/2014 | Sheridan ............. G06F 21/563 726/25 |
| 2014/0283083 A1* | 9/2014 | Gula ................... H04L 63/1433 726/25 |
| 2014/0331207 A1* | 11/2014 | Sridharan ........... G06F 11/3672 717/124 |
| 2014/0373151 A1 | 12/2014 | Webb et al. |
| 2015/0019323 A1 | 1/2015 | Goldberg et al. |
| 2015/0040225 A1 | 2/2015 | Coates et al. |
| 2015/0074390 A1 | 3/2015 | Stoback |
| 2015/0135287 A1 | 5/2015 | Medeiros et al. |
| 2015/0135320 A1 | 5/2015 | Coskun |
| 2015/0156212 A1 | 6/2015 | Khatri et al. |
| 2015/0186618 A1 | 7/2015 | Poorvin et al. |
| 2015/0222652 A1 | 8/2015 | Ramsey et al. |
| 2015/0271047 A1 | 9/2015 | McLean |
| 2015/0310211 A1 | 10/2015 | Mei et al. |
| 2015/0324457 A1 | 11/2015 | McLean |
| 2015/0332054 A1* | 11/2015 | Eck ...................... H04L 63/1416 726/25 |
| 2015/0365437 A1* | 12/2015 | Bell, Jr. ................. G06F 21/54 726/1 |
| 2016/0006749 A1 | 1/2016 | Cohen et al. |
| 2016/0014140 A1 | 1/2016 | Akireddy et al. |
| 2016/0014151 A1 | 1/2016 | Prakash |
| 2016/0078365 A1 | 3/2016 | Baumard |
| 2016/0099963 A1 | 4/2016 | Mahaffey et al. |
| 2016/0112445 A1* | 4/2016 | Abramowitz .......... G06Q 40/08 726/23 |
| 2016/0134653 A1* | 5/2016 | Vallone ................. H04L 41/046 726/25 |
| 2016/0139886 A1 | 5/2016 | Perdriau et al. |
| 2016/0156655 A1 | 6/2016 | Lotem et al. |
| 2016/0162690 A1* | 6/2016 | Reith .................... G06F 21/577 726/25 |
| 2016/0182546 A1 | 6/2016 | Coates et al. |
| 2016/0205127 A1* | 7/2016 | Roehl ................. H04L 63/1433 726/25 |
| 2016/0241591 A1 | 8/2016 | Ramsey et al. |
| 2016/0248789 A1* | 8/2016 | Nakamatsu ......... H04L 65/1073 |
| 2016/0253497 A1* | 9/2016 | Christodorescu ..... G06F 21/566 726/23 |
| 2016/0277423 A1 | 9/2016 | Apostolescu et al. |
| 2016/0313709 A1 | 10/2016 | Biesdorf et al. |
| 2016/0337400 A1 | 11/2016 | Gupta |
| 2016/0342805 A1 | 11/2016 | Lim |
| 2016/0378978 A1 | 12/2016 | Singla et al. |
| 2017/0026343 A1 | 1/2017 | Wardman |
| 2017/0026391 A1 | 1/2017 | Abu-Nimeh |
| 2017/0063893 A1 | 3/2017 | Franc et al. |
| 2017/0063905 A1 | 3/2017 | Muddu et al. |
| 2017/0093902 A1 | 3/2017 | Roundy et al. |
| 2017/0098087 A1 | 4/2017 | Li |
| 2017/0111379 A1 | 4/2017 | Khatri et al. |
| 2017/0140295 A1 | 5/2017 | Bandara |
| 2017/0142149 A1 | 5/2017 | Coates et al. |
| 2017/0169154 A1 | 6/2017 | Lin et al. |
| 2017/0171228 A1 | 6/2017 | McLean |
| 2017/0180418 A1 | 6/2017 | Shen |
| 2017/0201381 A1 | 7/2017 | Kinder et al. |
| 2017/0201431 A1 | 7/2017 | Kinder et al. |
| 2017/0201490 A1 | 7/2017 | Kinder et al. |
| 2017/0201548 A1 | 7/2017 | Kinder et al. |
| 2017/0208084 A1 | 7/2017 | Steelman et al. |
| 2017/0208085 A1 | 7/2017 | Steelman et al. |
| 2017/0243004 A1 | 8/2017 | Kinder et al. |
| 2017/0243005 A1 | 8/2017 | Kinder et al. |
| 2017/0243009 A1* | 8/2017 | Sejpal ................... G06F 21/577 |
| 2017/0244734 A1 | 8/2017 | Kinder et al. |
| 2017/0244750 A1 | 8/2017 | Kinder et al. |
| 2017/0244754 A1 | 8/2017 | Kinder et al. |
| 2017/0244762 A1 | 8/2017 | Kinder et al. |
| 2017/0318033 A1 | 11/2017 | Holland et al. |
| 2017/0318034 A1 | 11/2017 | Holland et al. |
| 2017/0346839 A1* | 11/2017 | Peppe ................. H04L 63/1433 |
| 2017/0359368 A1 | 12/2017 | Hodgman |
| 2018/0004948 A1* | 1/2018 | Martin ................ H04L 63/1425 |
| 2018/0069885 A1* | 3/2018 | Patterson ................ G06F 16/27 |
| 2018/0077189 A1 | 3/2018 | Doppke et al. |
| 2018/0077195 A1* | 3/2018 | Gathala ................ H04L 63/1433 |
| 2018/0089574 A1 | 3/2018 | Goto |
| 2018/0091306 A1 | 3/2018 | Antonopoulos et al. |

(56) References Cited

U.S. PATENT DOCUMENTS

| | | |
|---|---|---|
| 2018/0096140 A1* | 4/2018 | Bulygin .................. G06F 21/52 |
| 2018/0103010 A1 | 4/2018 | Diaz Cuellar et al. |
| 2018/0124073 A1 | 5/2018 | Scherman et al. |
| 2018/0124085 A1 | 5/2018 | Frayman et al. |
| 2018/0124092 A1* | 5/2018 | Pope ...................... H04L 63/20 |
| 2018/0124094 A1* | 5/2018 | Hamdi ................ G06F 12/0897 |
| 2018/0129811 A1* | 5/2018 | Diu ....................... G06F 21/577 |
| 2018/0152480 A1 | 5/2018 | Kinder et al. |
| 2018/0181599 A1 | 6/2018 | Crabtree et al. |
| 2018/0219899 A1* | 8/2018 | Joy ..................... G06F 11/3433 |
| 2018/0234434 A1 | 8/2018 | Viljoen |
| 2018/0288198 A1 | 10/2018 | Pope et al. |
| 2018/0324203 A1* | 11/2018 | Estes .................... G06F 9/5061 |
| 2018/0367550 A1 | 12/2018 | Musuvathi et al. |
| 2019/0014149 A1 | 1/2019 | Cleveland et al. |
| 2019/0037406 A1 | 1/2019 | Wash |
| 2019/0050554 A1 | 2/2019 | Fiske |
| 2019/0068630 A1 | 2/2019 | Valecha et al. |
| 2019/0095320 A1 | 3/2019 | Biswas et al. |
| 2019/0095801 A1 | 3/2019 | Saillet et al. |
| 2019/0102554 A1 | 4/2019 | Luo et al. |
| 2019/0102564 A1* | 4/2019 | Li ............................ G06N 3/04 |
| 2019/0102646 A1 | 4/2019 | Redmon |
| 2019/0104154 A1 | 4/2019 | Kumar et al. |
| 2019/0109717 A1* | 4/2019 | Reddy ................ H04L 63/1433 |
| 2019/0122258 A1 | 4/2019 | Bramberger et al. |
| 2019/0132344 A1 | 5/2019 | Lem et al. |
| 2019/0166149 A1* | 5/2019 | Gerrick ................ G06F 21/577 |
| 2019/0166152 A1* | 5/2019 | Steele ................. H04L 63/1441 |
| 2019/0173919 A1 | 6/2019 | Irimie |
| 2019/0242718 A1 | 8/2019 | Siskind et al. |
| 2019/0258807 A1 | 8/2019 | DiMaggio et al. |
| 2019/0297096 A1 | 9/2019 | Ahmed et al. |
| 2019/0342296 A1 | 11/2019 | Anandam et al. |
| 2019/0347423 A1* | 11/2019 | Sanossian ............... G06F 21/56 |
| 2019/0347433 A1 | 11/2019 | Chakravorty et al. |
| 2019/0370472 A1* | 12/2019 | Hodgman ................ G06F 8/62 |
| 2020/0012796 A1* | 1/2020 | Trepagnier ........... G06F 18/254 |
| 2020/0036750 A1 | 1/2020 | Bahnsen |
| 2020/0036751 A1 | 1/2020 | Kohavi |
| 2020/0057857 A1* | 2/2020 | Roytman ............... G06N 20/20 |
| 2020/0067980 A1* | 2/2020 | Livny ..................... G06N 3/08 |
| 2020/0074084 A1* | 3/2020 | Dorrans ................ G06F 21/577 |
| 2020/0082080 A1* | 3/2020 | Boulton ................ G06F 21/565 |
| 2020/0097662 A1* | 3/2020 | Hufsmith ............... H04L 9/0643 |
| 2020/0097663 A1* | 3/2020 | Sato ...................... G06F 21/577 |
| 2020/0110873 A1* | 4/2020 | Rosendahl ............ G06F 21/577 |
| 2020/0120126 A1* | 4/2020 | Ocepek .............. H04L 63/1433 |
| 2020/0159525 A1* | 5/2020 | Bhalla .................... G06N 5/022 |
| 2020/0177618 A1* | 6/2020 | Hassanzadeh ........ G06F 21/552 |
| 2020/0186544 A1 | 6/2020 | Dichiu et al. |
| 2020/0186569 A1* | 6/2020 | Milazzo ................... H04L 63/08 |
| 2020/0195683 A1 | 6/2020 | Kuppa et al. |
| 2020/0210590 A1* | 7/2020 | Doyle ....................... G06F 8/77 |
| 2020/0213346 A1* | 7/2020 | Shafet .................... G06F 16/953 |
| 2020/0257792 A1* | 8/2020 | Rivard ............... H04L 63/0869 |
| 2020/0259791 A1 | 8/2020 | Garcia et al. |
| 2020/0274894 A1 | 8/2020 | Argoeti et al. |
| 2020/0285737 A1* | 9/2020 | Kraus .................... G06F 21/552 |
| 2020/0285952 A1 | 9/2020 | Liu et al. |
| 2020/0314122 A1 | 10/2020 | Jones et al. |
| 2020/0327237 A1* | 10/2020 | Shakarian ............... G06F 17/18 |
| 2020/0336497 A1 | 10/2020 | Seul et al. |
| 2020/0351285 A1 | 11/2020 | Eisenkot et al. |
| 2020/0351302 A1 | 11/2020 | Kyle |
| 2020/0351307 A1 | 11/2020 | Vidas et al. |
| 2020/0356665 A1 | 11/2020 | Denney et al. |
| 2020/0358795 A1 | 11/2020 | Urbanski et al. |
| 2020/0358819 A1 | 11/2020 | Bowditch et al. |
| 2020/0364338 A1 | 11/2020 | Ducau et al. |
| 2020/0372129 A1* | 11/2020 | Gupta ..................... G06F 9/3842 |
| 2020/0380119 A1 | 12/2020 | Correa Bahnsen et al. |
| 2020/0394309 A1 | 12/2020 | Angelo et al. |
| 2021/0006575 A1 | 1/2021 | McLean et al. |
| 2021/0012012 A1* | 1/2021 | Soroush ................ H04L 63/205 |
| 2021/0034752 A1* | 2/2021 | Canada ................. G06F 21/552 |
| 2021/0034753 A1* | 2/2021 | Canada ................. G06F 18/217 |
| 2021/0034895 A1* | 2/2021 | John Archibald ... G06V 10/751 |
| 2021/0067562 A1 | 3/2021 | Kinder et al. |
| 2021/0103663 A1* | 4/2021 | Gadhe ................ G05B 19/0428 |
| 2021/0109797 A1 | 4/2021 | Zhou |
| 2021/0112078 A1* | 4/2021 | Huston, III ............. H04L 63/04 |
| 2021/0112087 A1 | 4/2021 | Tassoumt |
| 2021/0112090 A1 | 4/2021 | Rivera et al. |
| 2021/0133320 A1* | 5/2021 | Havenga ................ G06F 21/575 |
| 2021/0157926 A1* | 5/2021 | Handurukande ...... G06F 21/563 |
| 2021/0157945 A1* | 5/2021 | Cobb ................... H04L 63/0227 |
| 2021/0160273 A1* | 5/2021 | Choi .................... H04L 63/1433 |
| 2021/0173930 A1 | 6/2021 | Dahal |
| 2021/0173935 A1* | 6/2021 | Ramasamy ........... G06F 21/577 |
| 2021/0185057 A1 | 6/2021 | McLean |
| 2021/0192057 A1* | 6/2021 | Helfman ............... G06F 21/577 |
| 2021/0194853 A1* | 6/2021 | Xiao ...................... H04L 43/028 |
| 2021/0200840 A1* | 7/2021 | Kannan ..................... G06F 8/73 |
| 2021/0216928 A1* | 7/2021 | O'Toole .................. G06F 16/29 |
| 2021/0226926 A1* | 7/2021 | Crabtree ................... H04L 9/14 |
| 2021/0226970 A1 | 7/2021 | Ross et al. |
| 2021/0226982 A1* | 7/2021 | Marty .................. H04L 63/1441 |
| 2021/0226983 A1* | 7/2021 | Cunningham ........ H04L 63/102 |
| 2021/0258327 A1 | 8/2021 | Felke et al. |
| 2021/0273957 A1* | 9/2021 | Boyer ................... H04L 67/141 |
| 2021/0281609 A1* | 9/2021 | Crabtree .............. H04L 63/1425 |
| 2021/0306372 A1* | 9/2021 | Koral ................... H04L 63/1458 |
| 2021/0312058 A1* | 10/2021 | Chiarelli ................. G06Q 10/067 |
| 2021/0312351 A1* | 10/2021 | Pourmohammad ... G06F 16/906 |
| 2021/0342441 A1* | 11/2021 | Ross ....................... G06F 21/577 |
| 2021/0360007 A1* | 11/2021 | Paquin .................... G06N 3/04 |
| 2021/0367961 A1* | 11/2021 | Kuppa .................. G06F 40/205 |
| 2021/0390181 A1* | 12/2021 | McClay ................... G06N 20/00 |
| 2022/0004643 A1* | 1/2022 | Sloane ...................... G06N 5/04 |
| 2022/0006818 A1* | 1/2022 | Cunningham .......... H04L 63/14 |
| 2022/0014542 A1* | 1/2022 | Janakiraman ....... H04L 63/1433 |
| 2022/0021691 A1* | 1/2022 | Bhatkar ............... H04L 63/1466 |
| 2022/0038424 A1 | 2/2022 | Liu et al. |
| 2022/0043911 A1* | 2/2022 | Pomerantsev ........ G06F 21/566 |
| 2022/0070182 A1 | 3/2022 | Bowditch et al. |
| 2022/0070193 A1 | 3/2022 | Konda et al. |
| 2022/0070279 A1* | 3/2022 | Pang ..................... H04L 67/133 |
| 2022/0078203 A1* | 3/2022 | Shakarian ............... G06F 16/951 |
| 2022/0083644 A1* | 3/2022 | Kulshreshtha .......... G06F 21/52 |
| 2022/0100868 A1* | 3/2022 | Tarrant ................... G06N 20/00 |
| 2022/0159033 A1* | 5/2022 | Mizrahi ............... H04L 63/1441 |
| 2022/0179908 A1* | 6/2022 | Wei ......................... G06F 18/24 |
| 2022/0191230 A1* | 6/2022 | Morgan ............... H04L 63/1425 |
| 2022/0206819 A1* | 6/2022 | Pokam .................. G06F 9/3834 |
| 2022/0210656 A1* | 6/2022 | Shaw .................... H04W 12/08 |
| 2022/0237764 A1* | 7/2022 | Mullet .................... G06N 20/00 |
| 2022/0263850 A1* | 8/2022 | Colyandro, Jr. ..... H04L 63/1433 |
| 2022/0394034 A1* | 12/2022 | Keith ....................... G06F 9/547 |
| 2022/0400135 A1* | 12/2022 | Gamra ................. H04L 63/1433 |
| 2022/0407891 A1* | 12/2022 | Albanese ............. H04L 63/1433 |
| 2022/0414206 A1* | 12/2022 | Hinkle .................. G06F 16/951 |
| 2023/0021226 A1* | 1/2023 | Bobrov .................. G06F 21/577 |
| 2023/0021414 A1* | 1/2023 | Kumar ................... G06F 21/577 |
| 2023/0105087 A1 | 4/2023 | Borges |
| 2023/0370486 A1 | 11/2023 | Paquette et al. |
| 2023/0421578 A1 | 12/2023 | Mullins et al. |

FOREIGN PATENT DOCUMENTS

| | | |
|---|---|---|
| WO | WO2007/002749 A2 | 1/2007 |
| WO | WO2007/090605 A1 | 8/2007 |
| WO | WO2010/059843 A2 | 5/2010 |
| WO | WO2021/067238 A1 | 4/2021 |

OTHER PUBLICATIONS

Bozorgi, Mehran, Saul, Lawrence K., Savage, Stefan.and Voelker, Geoffrey M; "Beyond Heuristics: Learning to Classify Vulnerabilities and Predict Exploits"; in Proceedings of the 16th ACM SIGKDD international conference on Knowledge discovery and data mining—KDD '10, Jul. 25-28, 2010, Washington, DC, USA.

(56) References Cited

OTHER PUBLICATIONS

Edkrantz, Michel and Said, Alan; "Predicting Cyber Vulnerability Exploits with Machine Learning"; Available at: https://ebooks.jospress.nl/publication/41264; vol. 278, Thirteenth Scandinavin Conference on Artificial Intelligence; 2015.
Bullough, Benjamin L., et al. "Predicting Exploitation of Disclosed Software Vulnerabilities Using Open-source Data"; arXiv:1707.08015v1 [cs.CR] Jul. 25, 2017.
Fang, Yong, et al.; "FastEmbed: Predicting vulnerability exploitation possibility based on ensemble machine learning algorithm." PLOS ONE 15.2 (2020): https://doi.org/10.1371/journal.pone.0228439; Feb. 6, 2020.
Huang, Shin-Ying and Ban, Tao; "Monitoring Social Media for Vulnerability-Threat Prediction and Topic Analysis"; Available at: https://ieeexplore.ieee.org/abstract/document/9343128; 2020 IEEE 19th International Conference on Trust, Security and Privacy in Computing and Communications (TrustCom). IEEE, 2020.
Edkrantz, Michel; Predicting Exploit Likelihood for Cyber Vulnerabilities with Machine Learning; Department of Computer Science and Engineering; Chalmers University of Technology, Gothenburg, Sweden; Master's Thesis. 2015.
Almukaynizi, Mohammed, et al.; "Proactive Identification of Exploits in the Wild Through Vulnerability Mentions Online"; IEEE, 2017.
Xiao, Chaowei, et al.; "From Patching Delays to Infection Symptoms: Using Risk Profiles for an Early Discovery of Vulnerabilities Exploited in the Wild"; 27th USENIX Security Symposium Aug. 15-17, 2018, Baltimore, MD, USA; USENEX Association; 2018.
Tavabi, Nazgol, et al.; "DarkEmbed: Exploit Prediction with Neural Language Models"; The Thirtieth AAAI Conference on Innovative Applications of Artificial Intelligence (IAAI-18); 2018.
Jacobs, Jay, et al. "Improving vulnerability remediation through better exploit prediction"; Journal of Cybersecurity, 2020, 1-12; doi: 10.1093/cybse c/tya a015; https://academic.oup.com/cybersecurity/article/6/1/tyaa015/5905457; Published by Oxford University Press; 2020.
Yin, Jiao, et al. "Apply transfer learning to cybersecurity: Predicting exploitability of vulnerabilities by description"; Knowledge-Based Systems 210, Dec. 27, 2020: 106529. Available at: https://www.sciencedirect.com/science/article/abs/pii/S0950705120306584.
Suciu, Octavian, et al. "Expected Exploitability: Predicting the Development of Functional Vulnerability Exploits." arXiv:2102.07869v1 [cs.CR]; Feb. 15, 2021.
Afroz, S. and Greenstadt, R. "PhishZoo: Detecting Phishing Websites by Looking at Them"; IEEE Fifth International Conference on Semantic Computing, 2011; pp. 368-375; doi: 10.1109/ICSC.2011.52; 2011.
Alkhawlani, Mohammed, Elmogy, Mohammed and Elbakry, Hazem; "Content-based image retrieval using local features descriptors and bag-of-visual words"; International Journal of Advanced Computer Science and Applications, vol. 6 No. 9 2015; pp. 212-219; 2015.
Buber, E., Demir, O. and Sahingoz, O.K.; "Feature selections for the machine learning based detection of phishing websites"; 2017 International Artificial Intelligence and Data Processing Symposium (IDAP), 2017; pp. 1-5; doi: 10.1109/DAP.2017.8090317; 2017.
Lin, Tsung-Yi, et al.; "Microsoft coco: Common objects in context"; European Conference on Computer Vision, Springer, Cham, 2014; 2014.
Liu, Y., Wang, Q., Zhuang, M. and Zhu, Y.; Reengineering Legacy Systems with RESTFul Web Service; 2008 $32^{nd}$ Annual IEEE International Computer Software and Applications Conference, 2008; pp. 785-790; doi: 10.1109/COMPSAC.2008.89; 2008.
White, Joshua S., Matthews, Jeanna N., and Stacy, John L.; A method for the automated detection phishing websites through both site characteristics and image analysis Cyber Sensing 2012; vol. 8408; International Society for Optics and Photonics, 2012; 2012.
URLVoid; URLVoid.com; retrieved from archives.org: https:web.archive.org/web/20180730215132/https.://www.urlvoid.com/); Published Jul. 30, 2018.
International Search Report and The Written Opinion of the International Searching Authority; International Application No. PCT/US2022/036699; mailed Jan. 3, 2023.
Buyukkayhan, Ahmet Sali; Oprea, Alina; Li, Zhou; and Robertson, William; "*Lens on the endpoint; Hunting for malicious software through endpoint data analysis*"; International Symposium on Research in Attacks, Intrusions, and Defenses; RAID 2017: Research in Attacks, Intrusions, and Defenses Proceedings; pp. 73-79; Sep. 18-20, 2017; Atlanta, GA, USA.
Secureworks—Log Management—Protect your infrastructure from known and emerging threats; www.secureworks.com/resources/ds-log-management; 2015 (available).
Sofya Raskhodnikova & Adam Smith; CSE 598A Algorithmic Challenges in Data Privacy; Lecture 2; Jan. 19, 2010.

\* cited by examiner

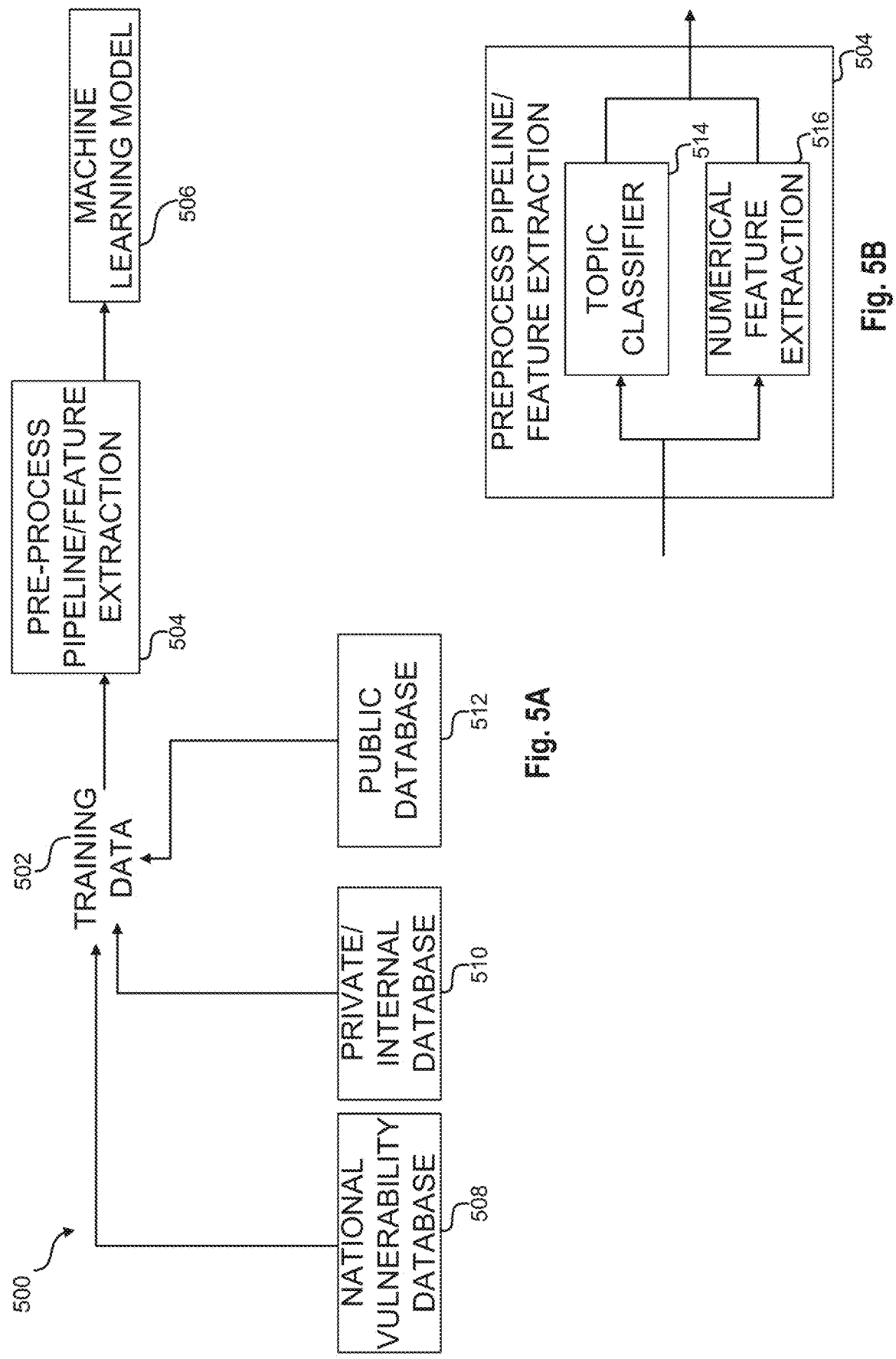

SYSTEMS AND METHODS OF ATTACK TYPE AND LIKELIHOOD PREDICTION

TECHNICAL FIELD

This disclosure relates generally to identifying cybersecurity attacks on computer systems, including networks and/or services, and more particularly relates systems and methods for determining one or more attack types associated with cybersecurity vulnerabilities and predicting a potential likelihood that an identified attack type may target such vulnerabilities.

BACKGROUND

New cybersecurity vulnerabilities are discovered and published daily. However, often only a subset of these vulnerabilities are actually used in attacks or include a published exploit. Current vulnerability management tools include goals, such as to identify vulnerabilities and prioritize those vulnerabilities according to their context. Such actions can aid customers in focusing on the most relevant security issues. In the context of prioritizing vulnerabilities, knowing in advance which vulnerabilities will be acted upon, e.g., by use in attacks, in malicious software, or as published exploits, provides information to aid in determining a true severity of vulnerabilities found. Knowing if a vulnerability will be used in an attack, in addition to knowing which type of attack, before such an attack occurs may provide valuable information and allow customers to resolve a vulnerability before such a vulnerability is exploited. Such predictive functionality is generally currently not available in conventional vulnerability management tools, which typically merely point to known attacks for specific vulnerabilities, rather than providing such predictions.

Accordingly, it can be seen that a need exists for systems and methods directed to identifying types of attacks associated with a vulnerability, and predicting a likelihood that one or more types of attack will occur; and provide remedial or potential remedial actions to address or fix such a vulnerability. The present disclosure is directed to the foregoing and other related, and unrelated, problems/issues in the art.

SUMMARY

Briefly described, according to various aspects, the present disclosure is directed to systems and methods that obtain details/information as to cyber security vulnerabilities and vulnerability features associated with the cyber security vulnerabilities can be extracted. The vulnerability features, once obtained, may form a series of segregated one or more intermediate inputs, each representing different features associated with each of the vulnerabilities and derived from one of the vulnerability features. Once the one or more intermediate inputs are formed, the one or more intermediate inputs may be applied to one or more attack class predictors or classifiers to determine a probability or likelihood that a particular attack is or can be associated with or used in relation to an identified vulnerability. For example, a newly identified and/or published vulnerability. One or more machine learning models trained with known vulnerabilities with known attack types may be utilized to train and form/update the attack class predictor or classifiers. The output generated by the attack class predictors or classifiers may be a probability or likelihood indicative of the likelihood that the particular attack may occur; represented by, for example, a number from a 0 to a 1. Once a likelihood of an attack occurring is determined for each of one or more attacks, attack type labels may be assigned to the identified vulnerability (e.g. a new vulnerability). The results, including the attack type labels and likelihood of an attack to occur, may be displayed, along with relevant information regarding the vulnerability, on a display or a user interface or formatted for display, and additionally can include a determined or suggested solution, remedy identification, or potential remedial action for any of the attack types.

In one aspect, the present disclosure provides a method for prediction of cybersecurity attacks, including, in embodiments, an attack type or types, and a likelihood for a vulnerability identified in a monitored information handling system such as a computer system, network, services, etc. being subjected to each such identified attack type. The method may include monitoring for a new vulnerability, and in response to a detection of the new vulnerability, extracting one or more inputs including one or more vulnerability features associated with the new vulnerability and inputs to one or more attack type classifiers to determine if and what attack types are associated with the new vulnerability. In embodiments the method includes applying the one or more inputs and each of the one or more types of attacks identifying and/or associated with the new vulnerability to an attack likelihood classifier to generate a likelihood that each of the one or more attacks could/will occur. In addition, the method may include assigning one or more attack type labels to the new vulnerability based on each attack type associated with the new vulnerability. The method also may also include generating a user interface to display the new vulnerability, each of the one or more attack type labels, and the likelihood that each of the one or more attacks occur.

In other embodiments, the method further can include determining, based on each attack type associated with the new vulnerability and the likelihood that each of the one or more attacks will occur, a severity of the new vulnerability. In another embodiment, the extraction of each of the one or more vulnerability features into one or more inputs may utilize one-hot encoding. In some embodiments, the one or more inputs include topic detection or topic mapping, through which a series of topics defining a topic vector are selected or generated, with each topic having at least one numerical feature extraction. The topics can include a selected number of topics derived from text extracted from the description of the vulnerability (e.g. using Natural Language Processing (NLP) to generate topics based on text derived from prior vulnerabilities). The topics can be developed using machine learning models to create the series of different/separate topics.

In embodiments, the new vulnerability and one or more vulnerability features associated with the new vulnerability may be obtained from the National Vulnerability Database (NVD) and potentially from other sources such as security analysis. The one or more attack type classifiers may be trained via a machine learning model with known vulnerabilities, associated known attack types, and associated other one or more vulnerability features. For example, the machine learning model can be trained using data (e.g. historical data) relating to prior topic determinations for similar vulnerabilities; by past exploitations available for vulnerabilities, and by input/review of historical data relating to which known vulnerabilities have been attacked by which known attacks to create labels for such attacks for use by the machine learning model.

In embodiments, the method also may include identifying and/or associating one or more known attacks for a new vulnerability or known vulnerabilities, and based on the identified known attack(s), assigning a label associated with the known attack to the new vulnerability or known vulnerabilities. The label may indicate that the known attack has occurred for the new vulnerability or known vulnerabilities, such as in relation to a user or a third party. The method may further include determining remedial procedures to be performed in response to the known attack.

In another embodiment, an output of the attack likelihood classifier includes a probability represented by a number between 0.0 and 1.0. A 0.0 may indicate the lowest likelihood that the attack will occur for the vulnerability, while a 1.0 may indicate the highest likelihood that the attack will occur for the vulnerability. The one or more vulnerability features may include one or more of a vulnerability description, a list of one or more vulnerable products, vulnerable configurations, a list or one or more references mentioning the vulnerability, a Bugtraq identifier, a CVSS score, and other CVSS metrics.

In other embodiments, the extraction of each of the one or more vulnerability features into one or more inputs, further may include application of a vulnerability description included in the one or more vulnerability features to a topic model thereby forming a topic vector. The topic vector may include a selected number of topics, for example, at least 20-30 topics, or more each topic represented by a value between 0.0 and 1.0. The number of topics can be selected to ensure a substantial sample size for each vulnerability.

In other aspects, the present disclosure provides a system for prediction of attack types and an attack type likelihood that such attacks will be used against or to exploit a vulnerability identified in a monitored computer system, network, services, etc . . . . In embodiments, the system includes an attack class predictor. For example, the attack class predictor may include a plurality of attack likelihood classifiers. Each attack likelihood classifier can be associated with a distinct attack type and the attack class predictor is configured to obtain a new vulnerability and associated therewith vulnerability features. The attack class predictor can be configured to extract the associated vulnerability features into one or more inputs. The attack class predictor can be configured to submit the one or more intermediate inputs to each of the one or more attack likelihood classifiers, each configured to generate an output indicating the probability that each attack type will occur for the new vulnerability. An output of the attack likelihood classifier may be a value indicating the likelihood or probability that each identified/associated attack type will occur for the new vulnerability. The system further will include an input/output circuitry. The input/output circuitry may be configured to generate a display including vulnerability data in a readable format. The vulnerability data may include one or more of the new vulnerability, the associated vulnerability features, each attack type associated with the new vulnerability, and the likelihood or probability that the attack type will occur.

In embodiments, each attack type associated with a new vulnerability is indicated by an attack type label, and the attack type circuitry further may be configured to receive a notice, report, or other indication that a particular attack type is associated with the new vulnerability from one or more public or private exploit databases or repositories. In response to reception of such an indication, associate the particular attack type to the new vulnerability. In embodiments, an attack type may be associated with a new vulnerability by setting a bit to a value if 1.0, the bit being associated with an attack type label of the attack type.

In embodiments, each of the plurality of attack likelihood classifiers may be trained via a supervised machine learning model. In another embodiment, each of the plurality of attack likelihood classifiers may be trained with training data including one or more known vulnerabilities associated with a particular attack type and each of the one or more known vulnerabilities' features. In another embodiment, the display may be transmitted to a graphical user interface (GUI), the GUI including vulnerability management and remediation data and statistics.

In other aspects, the present disclosure can provide a non-transitory machine-readable storage medium storing processor-executable instructions or programming that, when executed by at least one processor, causes the at least one processor to obtain a new vulnerability and associated vulnerability features. The executed instructions may further pre-process the associated vulnerability features to form one or more inputs provided or supplied to one or more attack type classifiers that are configured to identify one or more attack types associated with the vulnerability. The executed instructions apply, for each of the one or more attack types, the one or more inputs and one of the one or more attack types associated with the vulnerability to an attack likelihood classifier to thereby determine a probability that the identified attack type is likely to occur. This step can be repeated for each identified attack type for the vulnerability. The executed instructions also may generate a display including then new vulnerability, the associated vulnerability features, each of the one or more attack types associated with the new vulnerability, and the probability that each of the one or more attack type is likely to occur.

In another embodiment, the new vulnerability may be obtained from one or more of public repositories, private repositories, and other private sources. In another embodiment, the pre-processing may include one or more of applying vulnerability descriptions to a topic model, determining a character length of the vulnerability's description, determining a number of vulnerable products, determining a number of vulnerable configurations, determining a number of references mentioning the vulnerability, setting a bit to 1.0 if a Bugtraq identifier exists, and assigning a numerical value to CVSS metrics.

In other aspects, in order to improve the prioritization of vulnerabilities that can render information handling systems open to attacks, the present disclosure provides systems and methods for identifying and associating attack types with vulnerabilities and predicting a likelihood or probability of such attacks occurring for each attack type associated with such vulnerabilities. For example, such attacks can include an attack through malware, Advanced Persistent Threats (APT), direct exploitation by a malicious actor, published exploits or weaponized exploits, or other attack types. System supervised machine learning modules or engines, programmed with a combination of prediction models, where each model is trained using features associated with known vulnerabilities to predict one specific type of attack, are utilized. The combination of the output of these models gives the predicted type(s) of attack of a vulnerability. While some previous work built models that predict if an attack will occur or not, such models described herein predict the type(s) of attack(s) targeting vulnerabilities, as well as the likelihood such an attack(s) will occur.

In an embodiment, a first step of the method consists in building the features which will be used by the predictive models. The features are based upon a combination of properties associated with a vulnerability, along with a generation of topics from the textual vulnerability descriptions. These topics are identified through the use of a topic model, a natural language processing algorithm, which identifies the underlying concepts of a corpus of text. This model outputs a list of topics, represented as a series of words and their importance as a number between 0 and 1, along with the importance of these topics for every vulnerability, as a fixed-length vector of the number of topics for exploit prediction. Following this, supervised learning is used to train a predictive model for each class, i.e., each type of attack, using historical attack, malware, and exploit data as labels for vulnerabilities. Each model is trained on historical data using the features previously built, and the combination of all model prediction outputs identifies the predicted type(s) of attack. A vulnerability can have multiple labels: it can be predicted as used in one type of attack, used in multiple attacks, or used in none. Further, each attack can have a different likelihood or probability of actually occurring. Once these models are trained, they are then used as part of a cybersecurity platform/service, such as Taegis VDR® from SecureWorks, Inc., on every new or newly published vulnerability in order to predict if it will be seen in any type of attack in the near future.

Various objects, features and advantages of the present disclosure will become apparent to those skilled in the art upon a review of the following detail description, when taken in conjunction with the accompanying drawings.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIGS. 5A and 5B are schematic diagrams of a system to train an attack type classifier and/or an attack likelihood classifier, according to one aspect of the present disclosure.

The use of the same reference symbols in different drawings indicates similar or identical items.

DETAILED DESCRIPTION

Figure 1:
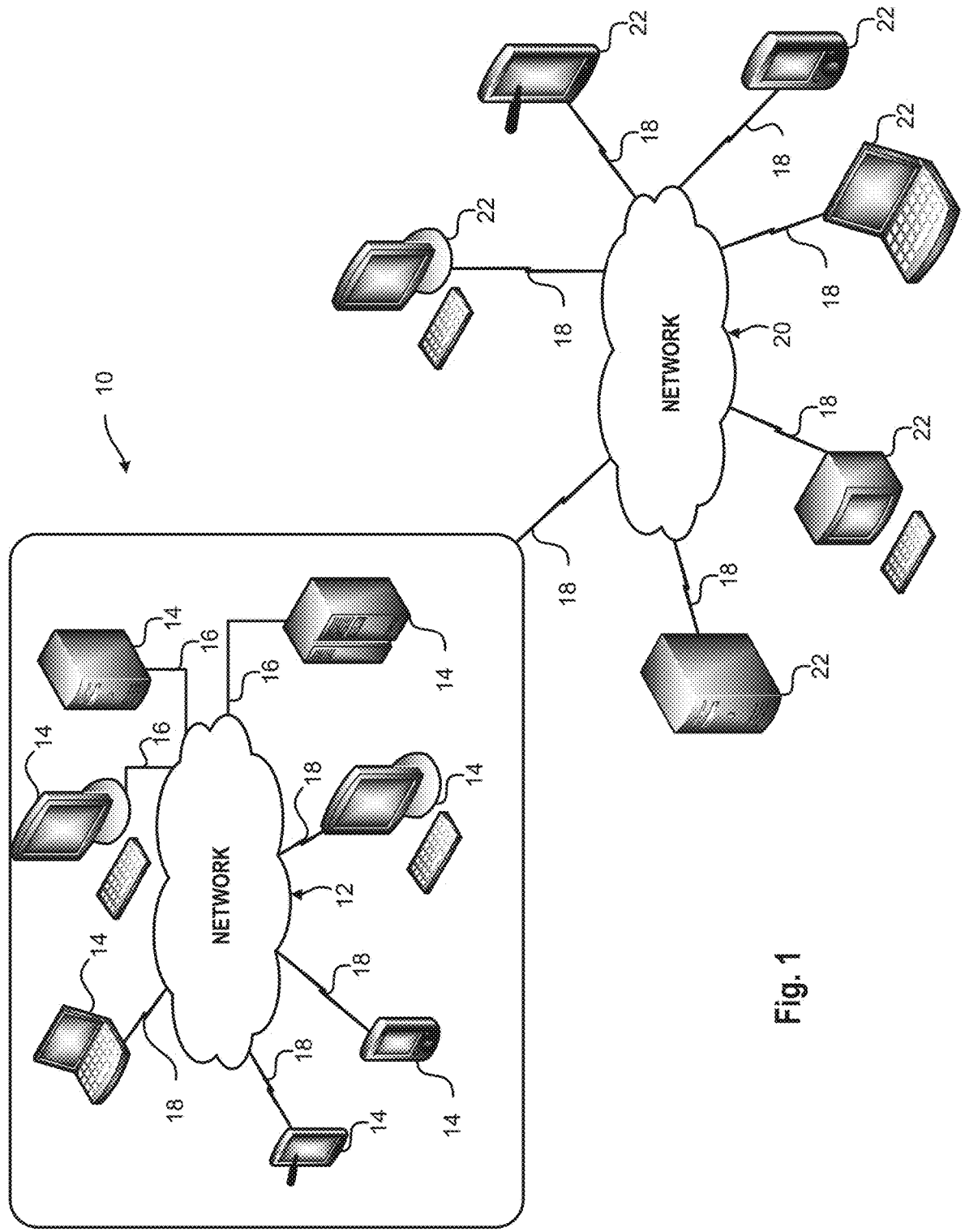
FIG. 1 is a schematic diagram of a data center including a networked system of information handling systems, according to one aspect of the present disclosure.

The following description in combination with the figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As shown in FIGS. 1-7, the present disclosure includes systems and methods for determining one or more attack types and a likelihood of an attack to occur for a new or newly identified/published vulnerability. For example, data or data sets from external sources (e.g. external databases, National Vulnerability Database (NVD), Bugtraq, etc.) or internal sources (e.g., security specialists, internal databases or repositories, etc.) can identify vulnerabilities. The new cybersecurity vulnerabilities for information handling systems can be received/obtained and interpreted, analyzed, modeled, etc. to determine one or more attack types associated with a new vulnerability or newly identified vulnerabilities (e.g., an attack type which can be used to exploit such a vulnerability) and the likelihood that the one or more attack types can occur.

The term "computing device" or "system device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "non-transitory machine-readable storage medium" is used to refer to any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. The memory may store or include instructions executable by the processor.

The term "processor" or "processing circuitry" is used to refer to any one processor or multiple processors included in a single device or distributed across multiple computing devices. The processor may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

The term "computer security vulnerability" is used to refer to a weakness or exploitable portion in software or instructions. Such a weakness can be used to attack software or instructions, user, or a computing device hosting the software or instructions. The term "exploit" is used to refer to a portion of code, instructions, or software written to abuse or take advantage of a vulnerability for the gain of the attacker.

The term "malware" is used to refer to malicious software or instructions installed on a user's computing device, typically without the knowledge of the user or without the user's knowledge of the malicious intent, which may cause damage or is harmful to the computing device or the user. The term "Advanced Persistent Threats" (APT) is used to refer to advanced and targeted attacks by malicious actors, often including a highly stealthy approach.

The term "direct exploitation by an attacker" is used to refer to an attack consisting of an attacker directly attacking a vulnerability without the use of any software or instructions.

The term "Common Vulnerabilities and Exposures" (CVE) is used to refer to numbers and/or identifiers assigned to vulnerabilities to uniquely identify them. CVEs are a free and open standard used by the cybersecurity community. Each vulnerability may be assigned a unique CVE number. The term "Common Vulnerability Scoring System" (CVSS) is used to refer to a free and open industry standard, identifying vulnerabilities by a score between 0 and 10 and other individual metrics, used for assessing the severity of security vulnerabilities. The CVSS identifies a number of metrics or characteristics to gauge the severity of a vulnerability. Each new vulnerability published with a CVE score includes a CVSS score. The term "Bugtraq" is used to refer to an electronic mailing list dedicated to computer security issues.

FIG. 1 is a block diagram of an exemplary data center 10 that may be managed or partially managed by a vulnerability management system. As shown in FIG. 1, the data center 10 can include a network 12 that may provide communications among a plurality of information handling systems 14, which can include work stations, personal computers, smart cellular telephones, personal digital assistants, laptop computers, servers, computing devices, other suitable devices, and/or combinations thereof. The information handling systems 14 further can be coupled to the network 12 through wired line connections 16, wireless connections 18, or any other suitable lines of communication or connection. As further shown in FIG. 1, the data center 10, and/or one or more of the information handling systems 14 thereof, can be communicatively coupled to a network, including a cloud based or other network as shown at 12 or 20 in FIG. 1, for example, through wired line connection 16, or through any other suitable connection, such as a wireless connection 18 (e.g., WiFi, cellular, etc.). The network 12 further can be accessible to/by one or more user or client managed information handling systems or devices 22 to facilitate communication between the client managed information handling systems 22 and the data center 10 managed or partially managed by a vulnerability management system. The network 12 can include an API interface of the vulnerability management system, though the network can include any suitable network, such as the Internet or other wide area network, a local area network, or a combination of networks, and may provide communications, e.g., data communications, among the vulnerability management system and the client managed information handling systems 22.

The client managed information handling systems 22 can be connected to the network 20 through wired connections, e.g., an Ethernet cable, or other suitable wired or wireless connections 18, e.g., WiFi, Bluetooth®, cellular connections (e.g., 3G, 4G, LTE, 5G, etc.), other suitable wireless connections or combinations thereof (FIG. 1), to enable the clients or operators of information handling systems 22 to communicate with the vulnerability management service, e.g., to access one or more services provided thereby. For example, the vulnerability management service can be a web service, such as Taegis VDR® from SecureWorks, Inc.

For purposes of the present disclosure, the information handling systems 14/22 may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. In one embodiment, the information handling systems may include a storage, such as random access memory (RAM) or (ROM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling systems also may include one or more buses operable to transmit communications between the various hardware components.

Figure 2A:
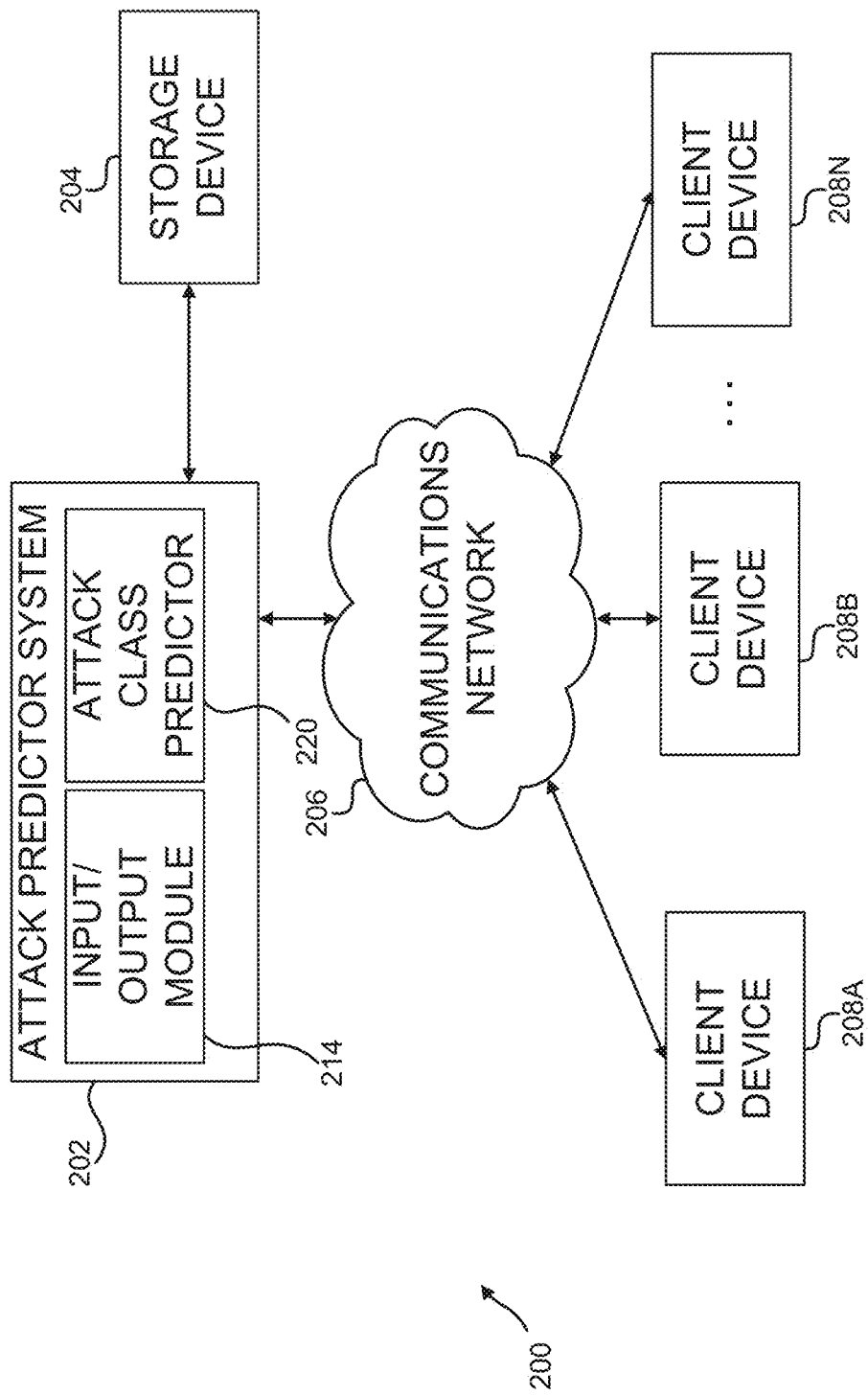
FIG. 2A is a schematic diagram of a system for identifying cybersecurity vulnerability details and features and for predicting a likelihood each of one or more attack types and occur, according to one aspect of the present disclosure.
Figure 2B:
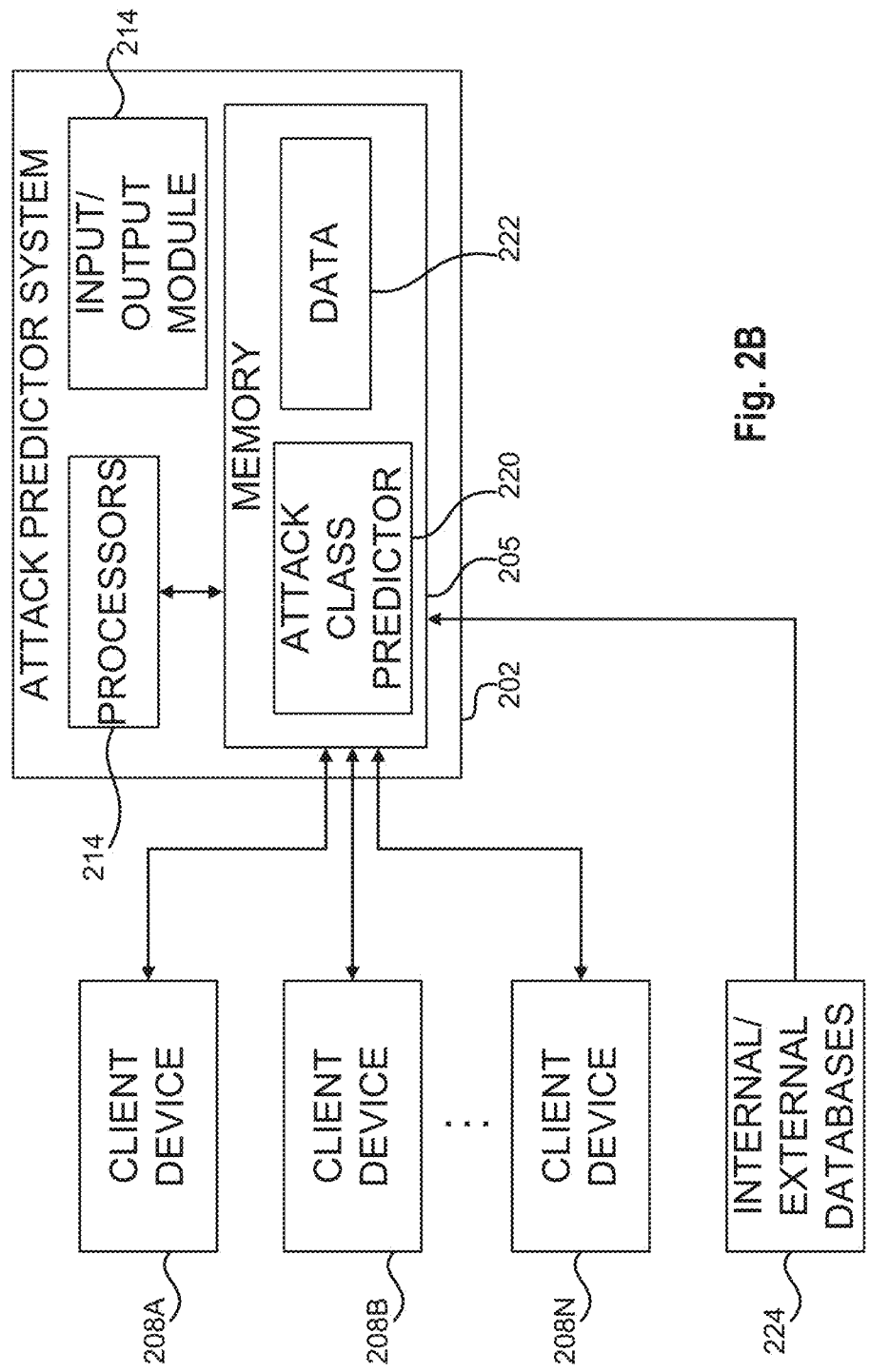
FIG. 2B is another schematic diagram of a system to predict a likelihood each of one or more attack types occur, according to one aspect of the present disclosure.

FIGS. 2A-2B are schematic diagrams illustrating non-limiting example configurations of an attack type detection and production system predicting one or more attack types and a likelihood each of the one or more attack types occur. An attack predictor system 202 can be configured to identify cybersecurity vulnerabilities of information handling systems and, according to aspects of the present disclosure, likelihood of the cybersecurity vulnerabilities occurring. For example, the attack system 200 of FIG. 2A-2B may be implemented in or by the information handling system 10 (e.g. in hardware or memory) of FIG. 1. In one embodiment, the attack system 200, as illustrated in FIG. 2A, includes a system device 202, a storage device 204, a communications network 206, and client devices 208A, 208B, up to 208N. The attack predictor system 202 may further be connected to a number of private and/or public databases, repositories, or other data sources. The attack predictor system 202 may monitor each of the client devices 208A, 208B, up to 208N, and other data sources for new vulnerabilities. The attack predictor system 202 may include various modules, engines, or circuitry, such as an attack class predictor 220 and/or an input/output module or 214. Each module may include corresponding instructions and may comprise hardware (e.g., one or more predictor processors and memory and/or other circuitry) or a portion of hardware in the attack predictor system 202. In another embodiment, the modules or circuitry may include, rather than physical components, specific instructions stored in memory of the attack predictor system 202 and/or in the storage device 204.

As noted, the attack predictor system 202 includes an attack class predictor 220 or engine. The attack class predictor 220 may be configured to monitor various data sources, described above and herein, for new vulnerabilities.

For example, the attack class predictor 220 may monitor the National Vulnerability Database (NVD) and/or Bugtraq communications, as well as monitoring data received at the input/output module 214 from other data sources and/or client devices 208A, 208B, up to 208N. For example, the attack class predictor 220 may include an application program interface (API) configured to allow users to send data, in particular new vulnerabilities, to the attack type identifier module 210. In such examples, a user may discover a vulnerability and send such information, for example via email or via a graphical user interface (GUI) or web-based user interface (WUI), to the attack class predictor 220 for classification and/or to generate predictions and notify one or more client devices 208A, 208B, up to 208N. Such notifications can be sent to a range of client devices or to a selected subset thereof. Further, the determinations or analysis described herein may automatically occur, as the attack class predictor 220 discovers new vulnerabilities, or may occur on demand, as the attack class predictor 220 is sent a request or sent a new vulnerability. The attack class predictor 220 may include, as instructions, one or more attack type or likelihood classifiers, as will be described in further detail below, to determine whether a particular attack is associated with or likely to occur/be exploited in relation to a new vulnerability. The attack class predictor 220 may also include pre-processing and/or feature extraction instructions utilized to process data and/or features associated with a new vulnerability prior to application to the one or more attack type classifiers. Such pre-processing and/or feature extraction instructions may include forming, based on the vulnerability features, one or more intermediate inputs.

In embodiments and as noted above, the attack class predictor 220 includes instructions to receive a new vulnerability and the one or more intermediate inputs, and generates a probability value indicating a probability of each of a series of attack types occurring or being brought against the new vulnerability as an output therefrom. In other embodiments, a plurality of attack class predictors or classifiers are included in the attack class predictor system 202. Each of the attack class predictors or classifiers may be based on a particular type of attack and will each determine a likelihood that a particular attack associated with that attack class predictor may occur or be brought against or used to exploit the new vulnerability based on the one or more intermediate inputs and one of the types of attack associated with the attack likelihood classifier. Each of the attack class predictors or classifiers can generate a probability value indicating such a likelihood or probability of that particular attack type occurring with respect to the new vulnerability as an output therefrom. Such actions may occur, as noted, for each type of known attack type.

Once the likelihood or probability that each of the attack types may occur is determined, based upon this probability output, each type of attack associated with the new vulnerability will be identified. Each attack class predictor 220 further will be configured to determine a severity of each associated attack type or an overall severity of the new vulnerability. Such a severity may be determined based on the amount of attack types, the type of each attack type, the likelihood that each of the attack types may occur, whether a solution exists in relation to the vulnerability and any attack type, and/or the types of existing solutions. The determined severity values for each associated attack type further can be used to rank the likelihood of each such attack type occurring or being brought against the vulnerability. In addition, as a further output based upon the determined severity of the vulnerability a notification can be provided to a user interface or a portion of user interface. The notification will include the new vulnerability, the associated vulnerability features, the assigned one or more attack type labels, the likelihood that each attack may occur, and the severity of the vulnerability. In an embodiment, such an attack class predictor 220 may be offered as a service by a vulnerability management service.

FIG. 2A is schematic illustration of another configuration or non-limiting example embodiment of the attack predictor system 202 configured to predict one or more attack types and a likelihood each of the one or more attack types occur, according to one aspect of the present disclosure. The attack predictor system of FIG. 2B may be implemented in or by the information handling system 10 of FIG. 1. Similar to FIG. 2A, the attack predictor system 202 may include instructions in a memory or other storage 204 related to the attack class predictor 220. The memory 205 may store such instructions, as well as other data 222 or instructions. The attack predictor system 202 may connect to various internal or external databases 224, repositories, or data sources.

Figure 3:
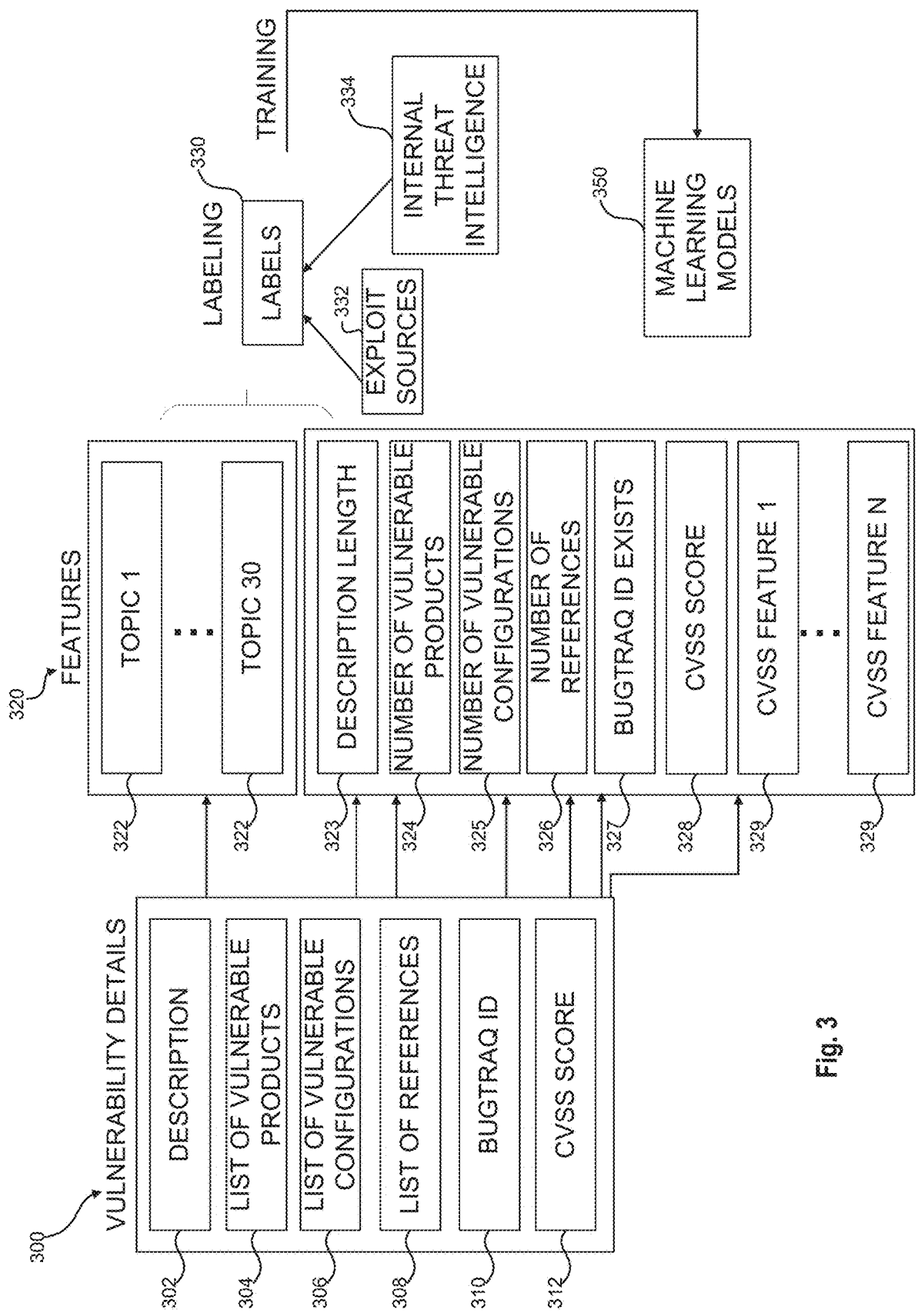
FIG. 3 is a schematic diagram illustrating a flow of information into system. Such as shown in FIG. 2A or 2B.

FIG. 3 schematically illustrates the operation of the attack predictor system 202 in accordance with the principles of present disclosure. In one embodiment, as a new vulnerability or newly identified vulnerability is received by the attack predictor system 202, details 300 of the new or newly identified vulnerability are identified and extracted or segregated. For example, the vulnerability details, as illustrated at 300, will include a description of the vulnerability 302, a list of vulnerable products 304, a list of vulnerable configurations 306, a list of references 308, and further can include a Bugtraq ID 310, and a CVSS score 312 (e.g. a common vulnerability scoring system score of typically between 1 to 10). Other details or aspects of the vulnerability also can be captured and extracted by the attack predictor system 202. The description 302 of the vulnerability can be taken from a listing of such a newly identified or new vulnerability as provided by an outside source (e.g. external databases, National Vulnerability Database (NVD), Bugtraq, etc.) or internal sources (e.g., security specialists, internal databases or repositories, etc.). In addition, prior vulnerabilities from a selected time period, (e.g. 10 years, 20 years, or other time period) can be utilized to identify descriptions common with past identified vulnerabilities and to extract or develop common textural identifiers, including words, phrases, or other identifiers.

Such vulnerability details 300 are used to generate a series of vulnerability features 320 that will be used by the predictive models or engines of a labeling system or module 330 to develop labels to identify attacks likely to be associated with or brought against the new or newly identified vulnerability. Each of the features 320 generally will comprise or include a combination of properties associated with a vulnerability, along with generation of a topic vector including a series of topics 322 generated from the recognized/selected text from the vulnerability description 302. In an example embodiment as shown in FIG. 3, a series of topics 322, including approximately 30 topics is illustrated, although it will be understood that a greater or lesser number of topics also can be developed or generated. Each of the topics are identified through the use of a topic model, which can include a natural language processing algorithm configured to identify an underlying concept of a corpus of extracted text from each of the vulnerability descriptions. The topic model can then output a listing of topics, e.g. topic 1 through topic 30, each of which topics can be represented by a series of words and each of which can be ranked according to an importance value. In embodiments, the ranking of the topics can be illustrated as a number between 0.0 and 1.0. The identified or extracted/selected topics, along with the rankings of the importance of such topics for each vulnerability identified will be provided with a series of additional selected features to a labeling system 330, which will be used to further train a machine learning model 350.

As further illustrated in FIG. 3, additional features of the vulnerability details that can be developed can include a description length 323, e.g. a selected number or length of character strings for a description; a number of vulnerable products identified 324, e.g. various programs such as email, inventory control, spreadsheets, etc. with known vulnerabilities; a number of vulnerable configurations or versions 325; a number of references 326 regarding each vulnerability; whether a Bugtraq ID 327 exists; and a CVSS score 328, which can include a series of CVSS scores for each feature identified 329. Other features the vulnerabilities identified and the details thereof further can be used.

The labeling system or module 330 will receive the vulnerability features 320, including the series of topics 322 and rankings thereof, as well as the additional set of features including description length 323, number of vulnerable products 324, number of vulnerable configurations 325, a number of references 326, whether a Bugtraq ID 327 exists, and CVSS score(s) 328. The labeling system or module 330 further can exploit other sources for information or data relating to the vulnerability features. For example, the labeling system or module 330 can access historical databases or receive inputs from such databases or other information sources for data regarding exploitation of similar vulnerabilities in the past (see 332). In addition, internal threat intelligence systems 334, such as provided by a managed security service provide (MSSP) reviewing incoming data for threats, further can provide inputs into the labeling system or module 330. The labeling system or module 330 will review the incoming information or data regarding the features of each vulnerability, together with the additional information or data, such as historical vulnerability exploitation data and threat intelligence data provided by an MS SP or other internal source, based on which vulnerabilities have been attacked by which types of attacks, and create labels identifying the various types of attacks and their association with a particular vulnerability. The labels also can include a ranking or likelihood for each attack occurring against the vulnerability. This information will then be used to train the machine learning model 350.

Figure 4:
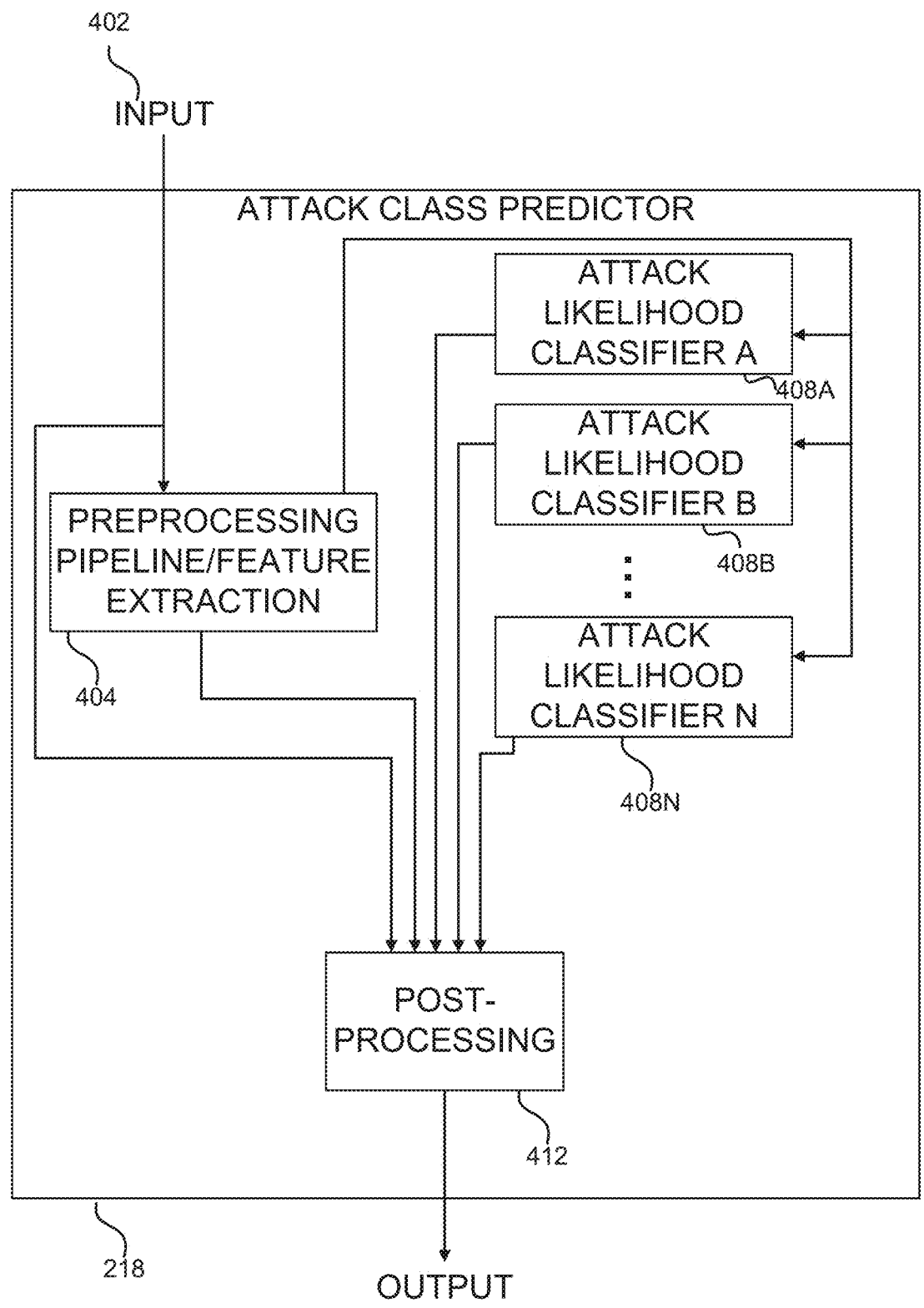
FIG. 4 is a schematic diagram of an attack class predictor, according to one aspect of the present disclosure.

FIG. 4 is a schematic diagram of the attack class predictor 220, according to one aspect of the present disclosure. The attack class predictor 220 may include sub-circuits or sub-instructions or routines. The attack class predictor 220 may include a pre-processing pipeline or feature extraction module 404 or instructions. The pre-processing pipeline or feature extraction module 404 or instructions may be configured to pre-process or extract features from an input 402. The input 402 may include a one or more vulnerability features of a new vulnerability. The one or more features may include a vulnerability description, vulnerable products, vulnerable configurations, references mentioning the vulnerability, a Bugtraq identifier, a CVSS score, CVSS metrics, other relevant data, or some combination thereof. In an embodiment, the pre-processing pipeline or feature extraction module 404 or instructions may include a topic classifier. The vulnerability description may be applied to the topic classifier and one or more topics may be output. In an example, the output may be a topic vector.

In a further example, the topic vector may include a particular topic and an associated number or weight. In yet another example, the topic vector may be a two dimensional matrix including a series of at least 30 numbers between 0 and 1, each number indicating a particular topic. The pre-processing pipeline or feature extraction module 404 or instructions may additionally include numerical feature extraction instructions. The numerical feature extraction instructions may take the vulnerability features as an input and output a vector or series of numbers associated with each vulnerability feature. For example, the output may include a number calculated or determined based on the character length of the vulnerability's description, a number calculated or determined based on the number of vulnerable products, a number calculated or determined based on the number of vulnerable configurations, a number calculated or determined based on the number of references that mention the vulnerability, a 1 or a 0 based on if a Bugtraq identification exists, the CVSS score, and a number determined based on CVSS metrics. Such an output may be considered one or more intermediate inputs, in relation to classifiers or machine learning models utilized in the attack class predictor 220.

Once one or more intermediate inputs are determined, the one or more intermediate inputs may be applied to one or more attack likelihood classifiers 408A, 408B, up to 408N. Each of the one or more attack likelihood classifiers 408A, 408B, up to 408N may correspond to a particular type of attack. In other words, each attack likelihood classifiers 408A, 408B, up to 408N may correspond to and provide a probability or likelihood that a particular attack may occur. In another embodiment, one attack likelihood classifier may be utilized to provide one or more probabilities that one or more attack types may occur. The output of the one or more attack type classifiers 408A, 408B, up to 408N may be a number indicating whether that particular attack type is associated with the new vulnerability.

Once the one or more intermediate inputs are applied to the one or more attack likelihood classifiers 408A, 408B, up to 408N, the one or more attack likelihood classifiers 408A, 408B, up to 408N may output a probability indicating a likelihood that a particular attack may occur for the new vulnerability. Each of the resulting outputs of each of the one or more attack type classifiers 408A, 408B, up to 408N, along with the one or more intermediate inputs and/or the input 402, may be transmitted to a post-processing module 412.

In an embodiment, the post-processing module 412 may aggregate the results of the application of data to the classifiers described above. In another embodiment, the post-processing module 412 may assign a particular attack type label or tag to a new vulnerability. The label or tag may include the attack type's name and likelihood that the attack type will occur. The post-processing module 412 may additionally format the labels or tags, such that the labels and tags may be displayed in a user interface in a readable and/or user friendly format for the new vulnerability. The post-processing module 412 may additionally determine the severity of the vulnerability based on the type of attacks for a new vulnerability, the number of attacks for the new vulnerability, and/or the likelihood that an attack may occur in relation to the new vulnerability.

In an embodiment, a new vulnerability may include or be associated with a known attack.

In such embodiments, the known attack may be considered to have the highest probability of occurring in relation to the new vulnerability. As such, rather than applying the intermediate input to the one or more attack likelihood classifiers 410A, 410B, or 410N, the likelihood of such an attack may be set to 1. In another example, a known vulnerability associated with a number of attack types and corresponding likelihoods may be updated based on such an input (e.g., an attack actually occurring for the known vulnerability). In such examples, the attack that has occurred may be set to 1 or a 100% likelihood that the attack will occur.

FIGS. 5A and 5B are schematic diagrams of a system 500 to train one or more attack likelihood classifier, according to one aspect of the present disclosure. Various data sources, such as the NVD 508, a private/internal database 510 or repository, and/or a public database 512 or repository, may be utilized to generate a set of training data 502. Such a set of training data 502 may include large amounts of data points. For example, the set of training data 502 may include about 150,000 vulnerabilities and associated vulnerability features, in addition to different attack types known to occur for such vulnerabilities. It will be understood that more or less data may be utilized to train the classifiers.

Once a set of training data 502 is obtained or determined, the set of training data 502 may be transmitted to a pre-process to a pre-processing pipeline and/or feature extraction module 504. The pre-processing pipeline and/or feature extraction module 504 may operate or be configured to operate as described for the pre-processing pipeline and/or feature extraction module 404. In other words, the pre-processing pipeline and/or feature extraction module 504 may be the same as the pre-processing pipeline and/or feature extraction module 404. As noted above the pre-processing pipeline and/or feature extraction module 504 may include a topic classifier 514 and/or a numerical feature extraction module 516. The topic classifier 514 may determine the topics associated with a set of data based on the description of the vulnerability, using topic detection or topic mapping, through which a series of topics defining a topic vector are selected or generated, with each topic having at least one numerical feature extraction. In embodiments, the topics built or generated by the machine learning model. However, in some embodiments, it could be possible to use topics established from an external source, which can be provided or received as an added feature, in addition to or separate from the machine learning model generated topics, without being generated from the machine learning model.

The output of the pre-processing pipeline and/or feature extraction module 504 may then be utilized, with a machine learning model 506, to train a specific attack type classifier and/or an attack likelihood classifier. For example, the set of training data 502 may include data associated with a specific or particular attack type. As such, the output classifier may be associated with that specific or particular attack type. In an embodiment, the machine learning model 506 may comprise a single machine learning model or an ensemble machine learning method. The machine learning model may include a neural network model, a Naïve Bayes model, a linear regression model, a logistic regression model, a support vector machine, a decision tree based model, or a k-nearest. An ensemble machine learning method may include two or more of the machine learning models described above or other machine learning models as will be understood by a person skilled in the art. Further, the ensemble machine learning model may utilize various methods to combine the output of a particular supervised machine learning model, such as bagging, boosting, stacking, Bayesian model averaging, Bayesian model combination, or a bucket of models. Other types of machine learning models or ensemble machine learning methods may be utilized, as will be understood by a person skilled in the art. Other methods may be utilized to weight, classify, or categorize the vulnerability features or one or more intermediate inputs prior to training a classifier or applying the data to a classifier, such as one-hot encoding.

Figure 6A:
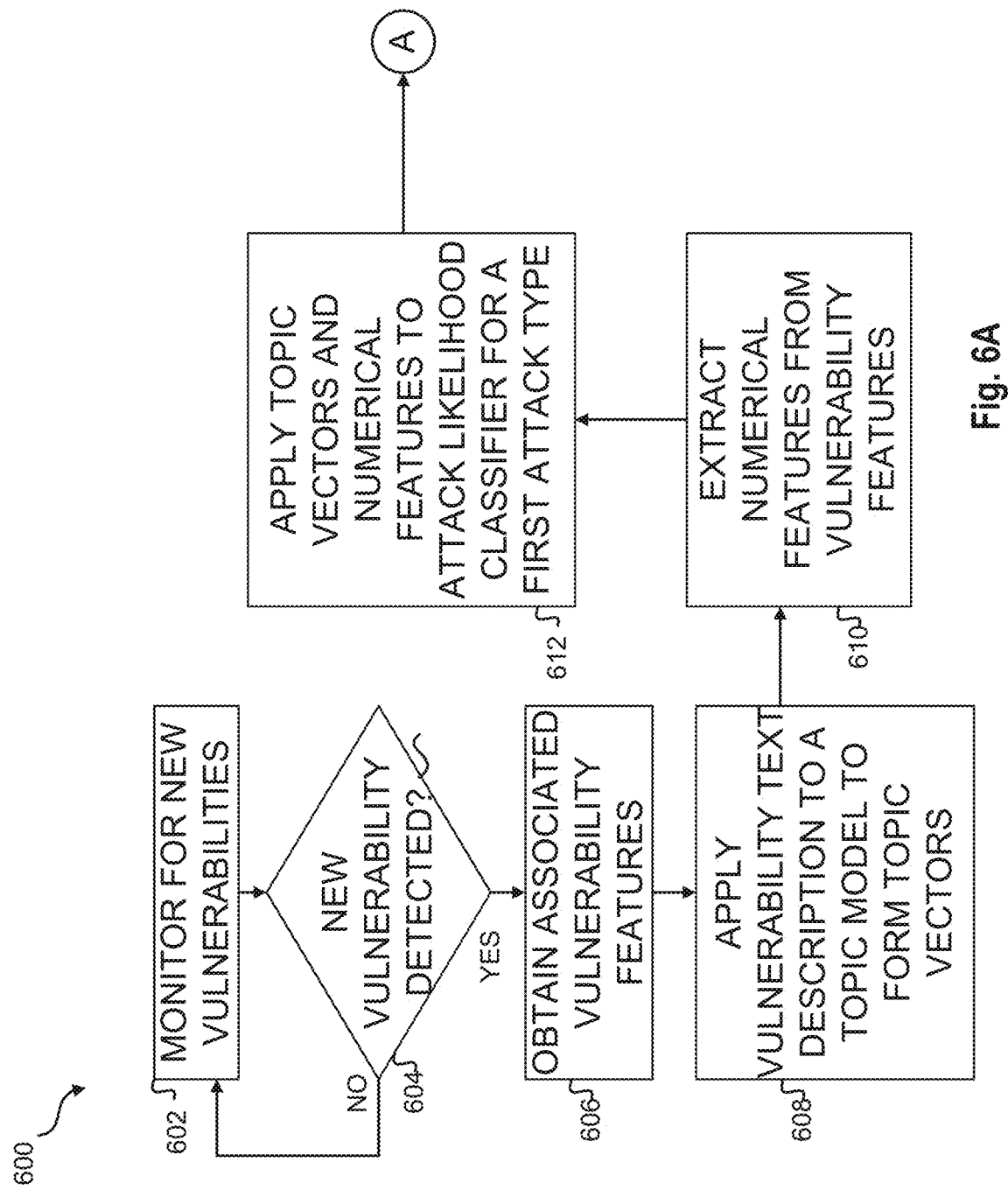
FIGS. 6A and 6B are methods/processes for predicting one or more attack types and a likelihood each of the one or more attack types occur, according to one aspect of the present disclosure.
Figure 6B:
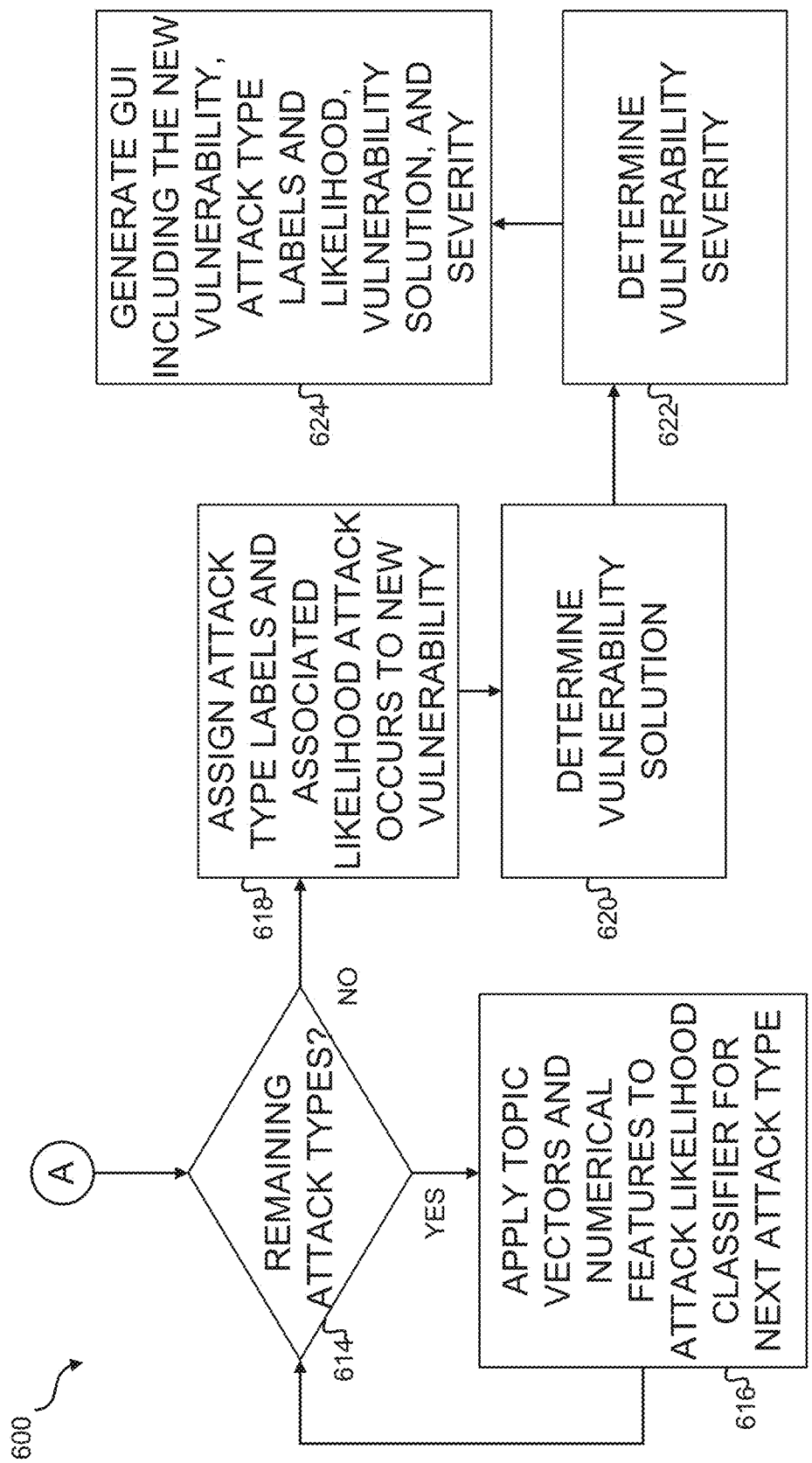

FIGS. 6A and 6B illustrate method/process steps for identifying and predicting one or more attack types and a likelihood each of the one or more attack types will occur for new and newly identified vulnerabilities, according to aspects of the present disclosure. It also will be understood that any of the FIGS. described herein may implement the method 600, in particular FIGS. 1-4.

At block 602, a system device, a processor, or an attack class predictor module or engine monitors various data sources for new vulnerabilities. The monitoring may be performed continuously or periodically. In embodiments, the attack class predictor module or engine may accept, as an input, new vulnerabilities. For example, if a user and/or security analyst discovers a vulnerability, the user and/or security analyst may provide or send the new vulnerability to the system device, a processor, or an attack class predictor module or engine. As such, the system device, a processor, or an attack class predictor module or engine may include an API, such as an open API, a REST or RESTful API, JSON or XML API, a SOAP API, or other suitable API as will be understood by a person skilled in the art. For example, a user may submit a new vulnerability via email, via a webform, via an HTTP or HTTPS put or post command, or via other suitable methods.

At block 604, once a specified time period or interval passes, the class predictor module or engine may determine whether a new vulnerability has been detected. In another embodiment, block 602 and block 604 may occur at substantially the same time or near the same time, as such processes may be continuous, e.g., a continuous determination of new vulnerabilities discovered.

At block 606, if a new vulnerability has been detected, the class predictor module or engine may obtain or receive the associated vulnerability features. The vulnerability features may be received as a list or set of data including identified or extracted text or other reference identifiers for the vulnerability details.

At block 608, text of the vulnerability description can be applied, transmitted, or provided as an input to a topic model. Such an application may result in topic vectors, as described above. The topic vectors may include a number of key topics and associated weights, e.g., represented as a number 0 to 1. The number of key topics may include at least 30 key topics. It will be understood that more or less key topics may be used. The key topics may describe or generalize key features of a vulnerabilities. The combination of key topics and weights may indicate which attacks may apply to such a vulnerability, at least, when applied to a classifier, e.g., a machine learning trained model.

At block 610, the system extracts numerical features from the vulnerability features. In such process, the system will determine or calculate a number for each vulnerability feature. Such a number may include values from 0 to 1. Other number ranges may be utilized. For example, the CVSS score may be utilized as is, rather than be converted or normalized to a number from 0 to 1. Once the numerical features are extracted and the topic vector is generated, the numerical features and topic vector may be aggregated to form an intermediate input or one or more intermediate inputs.

At block 612, the system will apply, transmit, or provide as an input (determined at block 612), the topic vectors and numerical features to an attack likelihood classifier or class predictor or a first attack likelihood classifier or class predictor. Such an application may result in an output that indicates the likelihood that an attack associated with the attack likelihood classifier or class predictor may occur in relation to the vulnerability.

At block 614, a determination is made as to whether there are any remaining attack types associated with any other attack likelihood classifier or class predictor. In other words, the system device, a processor, or an attack likelihood circuitry may implement an iterative process or loop that applies the topic vectors and numerical features to one or more attack likelihood classifiers or class predictors, each associated with a particular, different, and/or distinct attack type (see block 616). In some embodiments, the topic vectors and numerical features, may be applied to each attack likelihood classifier or class predictor in parallel with or at substantially the same time as the other attack likelihood classifiers or class predictors. The resulting output of a such a process results in a list of attack types and the likelihood that each attack type may occur in relation to the vulnerability.

Thereafter, of block 618, an attack type label or tag and an associated likelihood that such an attack may occur in relation to the new vulnerability will be assigned to or associate with the new vulnerability.

At block 620, the system also may determine, based on the vulnerability features and likelihood that particular attack types may occur, a solution or remedial action associated with such a vulnerability. For example, if an application includes a newly discovered vulnerability, a solution or remedial action may include to disable the application, downgrade the application, upgrade the application, or uninstall the application, in addition to other suitable actions. The system device, a processor, or an attack likelihood classifier or class predictor may determine such a solution based on the severity of the vulnerability.

At block 622, a severity or criticality of the vulnerability, and potentially each attack associated therewith can be provided, based on the number of associated attack types and the likelihood that each attack may occur, among other factors.

At block 624, a GUI or portion of a GUI may be generated to display the new vulnerability, the associated vulnerability features, the attack type labels (including the likelihood an attack may occur), a vulnerability solution (if available), and/or the severity of the vulnerability.

Figure 7:
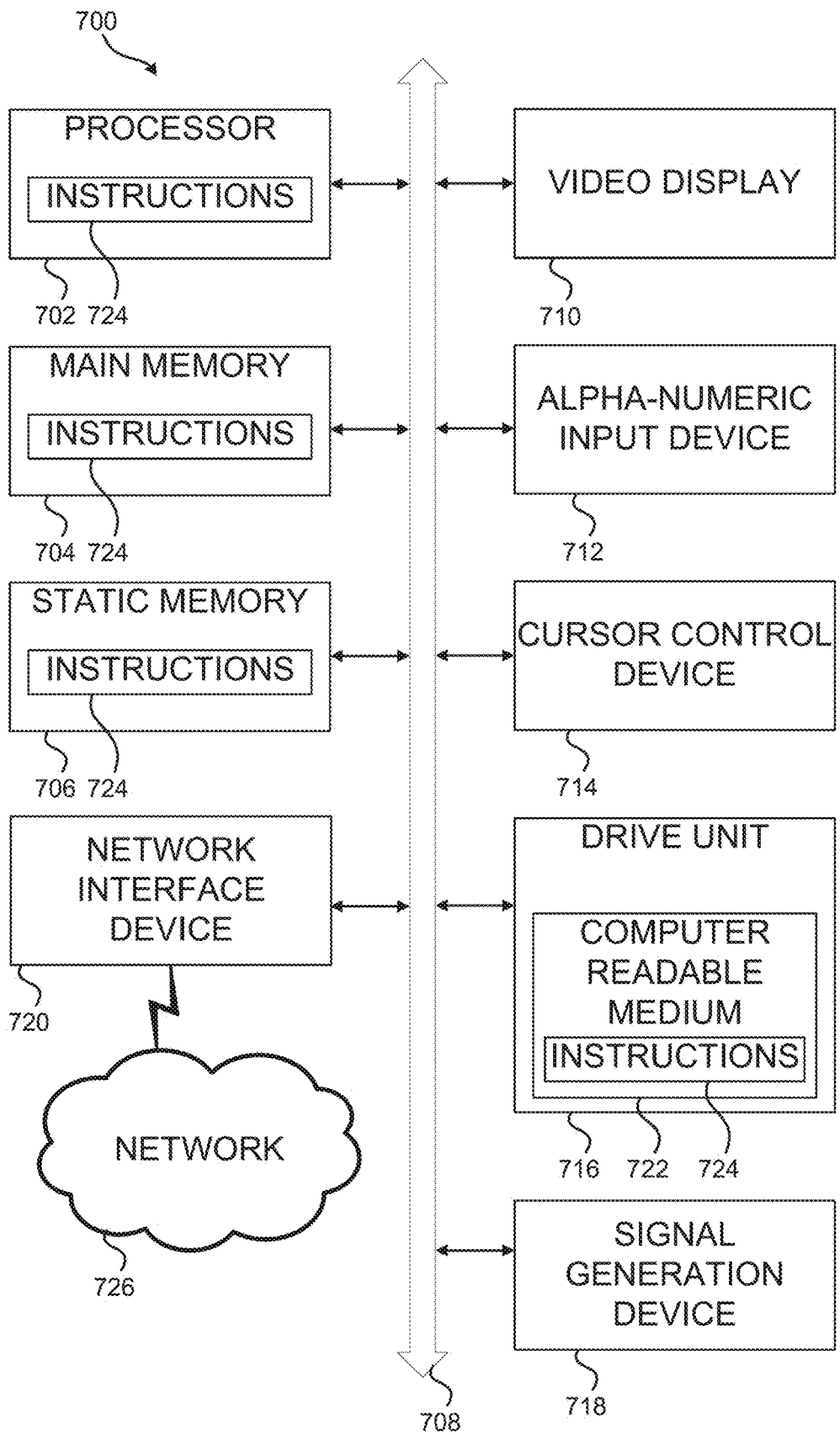
FIG. 7 is a schematic diagram of an information handling system capable of administering each of the specific embodiments, according to one aspect of the present disclosure.

FIG. 7 shows an example of an information handling system 700 capable of administering each of the specific embodiments of the present disclosure and variations thereof. The information handling system 700 can represent the systems of FIGS. 1 through 5B. The information handling system 700 may include a computer system or processor 702 such as a central processing unit (CPU), a graphics processing unit (GPU), or both. Moreover, the information handling system 700 can include a main memory 704 and a static memory 707 that can communicate with each other via a bus 708. The information handling system 700 includes near-field communications (NFC) device and interface 718, such as an antenna and NFC subsystem. The information handling system 700 can also include a disk drive unit 716, and a network interface device 720. As shown, the information handling system 700 further may include a video display unit 710, such as a liquid crystal display (LCD), an organic light emitting diode (OLED), a flat panel display, a solid state display, or a cathode ray tube (CRT), or other suitable display. The video display unit 710 may also act as an input accepting touchscreen inputs. Additionally, the information handling system 700 may include an input device 712, such as a keyboard, or a cursor control device, such as a mouse or touch pad, or a selectable interface on the display unit. The information handling system may include a battery system 714. The information handling system 700 can represent a device capable of telecommunications and whose can be share resources, voice communications, and data communications among multiple devices. The information handling system 700 can also represent a server device whose resources can be shared by multiple client devices, or it can represent an individual client device, such as a laptop or tablet personal computer.

The information handling system 700 can include a set of instructions that can be executed to cause the processor to perform any one or more of the methods or computer based functions disclosed herein. The processor 702 may operate as a standalone device or may be connected such as using a network, to other computer systems or peripheral devices.

In a networked deployment, the information handling system 700 may operate in the capacity of a server or as a client user computer in a server-client user network environment, or as a peer computer system in a peer-to-peer (or distributed) network environment. The information handling system 700 can also be implemented as or incorporated into various devices, such as a personal computer (PC), a tablet PC, a set-top box (STB), a smartphone, a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single information handling system 700 is illustrated, the term "system" shall also be taken to include any collection of systems or subsystems that individually or jointly execute a set, or multiple sets, of instructions to perform one or more computer functions.

The disk drive unit 716 or static memory 714 may include a computer-readable medium 722 in which one or more sets of instructions 724 such as software can be embedded. The disk drive unit 716 or static memory 714 also contains space for data storage. Further, the instructions 724 may embody one or more of the methods or logic as described herein. In a particular embodiment, the instructions 724 may reside completely, or at least partially, within the main memory 704, the static memory 706, and/or within the processor 702 during execution by the information handling system 700. The main memory 704 and the processor 702 also may include computer-readable media. The network interface device 720 can provide connectivity to a network 726, e.g., a wide area network (WAN), a local area network (LAN), wireless network (IEEE 702), or other network. The network interface 720 may also interface with macrocellular networks including wireless telecommunications networks such as those characterized as 2G, 3G, 4G, 5G, LTE or similar wireless telecommunications networks similar to those described above. The network interface 720 may be a wireless adapter having antenna systems 732 for various wireless connectivity and radio frequency subsystems 730 for signal reception, transmission, or related processing.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal; so that a device connected to a network 728 can communicate voice, video or data over the network 728. Further, the instructions 724 may be transmitted or received over the network 728 via the network interface device 720. In a particular embodiment, BIOS/FW code 724 reside in memory 704, and include machine-executable code that is executed by processor 702 to perform various functions of information handling system 700.

Information handling system 700 includes one or more application programs 724, and Basic Input/Output System and Firmware (BIOS/FW) code 724. BIOS/FW code 724 functions to initialize information handling system 700 on power up, to launch an operating system, and to manage input and output interactions between the operating system and the other elements of information handling system 700.

In another embodiment (not illustrated), application programs and BIOS/FW code reside in another storage medium of information handling system 700. For example, application programs and BIOS/FW code can reside in drive 716, in a ROM (not illustrated) associated with information handling system 700, in an option-ROM (not illustrated) associated with various devices of information handling system 700, in storage system 707, in a storage system (not illustrated) associated with network channel 720, in another storage medium of the information handling system 700, or a combination thereof. Application programs 724 and BIOS/FW code 724 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile, read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.), or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended claims.

What is claimed is:

1. A method for prediction of an attack for a vulnerability of an information handling system, comprising:
    receiving a disclosure of a new vulnerability, the disclosure comprising a plurality of vulnerability details;
    in response to receipt of the disclosure of the new vulnerability, developing one or more vulnerability features associated with the plurality of vulnerability details;
    providing the vulnerability features as one or more intermediate inputs to attack type classifiers configured to thereby determine, for each of a plurality of attack types, a probability of an occurrence of at least one of the plurality of attack types;
    if the probability of the occurrence of the attack type exceeds a selected threshold value, associating the at least one of the plurality of attack types with the new vulnerability;
    determining a likelihood of each attack type associated with the new vulnerability; and
    assigning one or more attack type labels to the new vulnerability based on each attack type associated with the new vulnerability.

2. The method of claim 1, further comprising; determining, based on each attack type associated with the new vulnerability a severity of each attack type associated with the new vulnerability.

3. The method of claim 1, wherein the vulnerability features include a series of topics, each topic having a numerical value assigned thereto.

4. The method of claim 3, wherein the topics are extracted from text of a description included as part of the vulnerability details of the disclosure of the new vulnerability.

5. The method of claim 1, further comprising generating a user interface to display the new vulnerability, each of the one or more attack type labels, and the likelihood that each of the attack types associated with the new vulnerability may occur.

6. The method of claim 1, wherein receiving a disclosure of a new vulnerability comprises receiving the disclosure of the new vulnerability from a National Vulnerability Database (NVD).

7. The method of claim 1, wherein the one or more attack type classifiers are trained via a machine learning model with known vulnerabilities and known attack types associated with each of the known vulnerabilities.

8. The method of claim 1, wherein associating the at least one of the plurality of attack types with the new vulnerability further comprises:
    associating a known attack for the new vulnerability based upon known attacks associated with known vulnerabilities matching extracted features of the new vulnerability having text descriptions;
    based on the known attack, assigning a label associated with the known attack to the new vulnerability or known vulnerabilities, the label indicating that the known attack has occurred for the new vulnerability or known vulnerabilities; and
    determining remedial procedures to be performed in response to the known attack.

9. The method of claim 1, wherein the one or more vulnerability features includes one or more of a vulnerability description, vulnerable products, vulnerable configurations, references mentioning the vulnerability, a Bugtraq identifier, a CVSS score, and CVSS metrics.

10. The method of claim 1, wherein developing each of the one or more vulnerability features into the one or more intermediate inputs includes application of a vulnerability description included in the one or more vulnerability features to a topic model thereby forming a topic vector including a plurality of topics, each topic represented by a value between 0 and 1.

11. A system for prediction of an attack for a vulnerability of an information handling system, the system comprising:
    an attack class predictor including a plurality of attack likelihood classifiers, each attack likelihood classifier associated with a distinct attack type and the attack class predictor configured to:
        obtain a new vulnerability having a plurality of vulnerability details, including a vulnerability description,
        extract a series of vulnerability features associated with the vulnerability details into one or more intermediate inputs, and
        submit the one or more intermediate inputs to each of the one or more attack likelihood classifiers, each configured to generate an output indicating a probability that each attack type will occur for the new vulnerability; and
    an input/output circuitry configured to generate a display including vulnerability data in a readable format, wherein the vulnerability data includes an identification of the new vulnerability, the associated vulnerability features, each attack type, and the probability that each attack type will occur for the new vulnerability.

12. The system of claim 11, wherein each attack type associated with the new vulnerability is indicated by an attack type label.

13. The system of claim 12, wherein the display is transmitted to a graphical user interface (GUI), the GUI including vulnerability management and remediation data and statistics.

14. The system of claim 11, wherein the attack class predictor is further configured to:
receive an indication that a particular attack type is associated with the new vulnerability from one or more public or private exploit databases or repositories, and in response to reception of the indication, associate the particular attack type to the new vulnerability.

15. The system of claim 14, wherein each attack type is associated with the new vulnerability by setting a bit to 1, the bit associated with an attack type label of the attack type.

16. The system of claim 11, wherein each of the plurality of attack likelihood classifiers are trained by a supervised machine learning model, and/or using training data of one or more known vulnerabilities associated with a particular attack type and one or more known vulnerabilities' features.

17. A non-transitory machine-readable storage medium storing processor-executable instructions that, when executed by at least one processor, cause the at least one processor to:
obtain a disclosure of new vulnerability including a plurality of associated vulnerability details, the vulnerability details including at least one of a description, a list of vulnerable products, a list of vulnerable configurations, a list of references, an ID, a CVSS score, or combinations thereof;
using the associated vulnerability details, develop a series of vulnerability features associated with the new vulnerability, the vulnerability features including at least a plurality of topics;
input the one or more vulnerability features to one or more attack class predictors and identifying one or more attack types associated with the new vulnerability;
generate an attack type label for each of the one or more attack types associated with the new vulnerability, and determine a probability one of each of the identified one or more attack types is likely to occur for the new vulnerability; and
generate a notification including the new vulnerability and the vulnerability features associated with the new vulnerability, each of the identified attack types associated with the new vulnerability, and the probability that each of identified attack types is likely to occur.

18. The non-transitory machine-readable storage medium of claim 17, wherein the new vulnerability is obtained from one or more of public repositories, private repositories, and other private sources.

19. The non-transitory machine-readable storage medium of claim 18, wherein pre-processing includes one or more of applying vulnerability descriptions to a topic model, determining a character length of the vulnerability's description, determining a number of vulnerable products, determining a number of vulnerable configurations, determining a number of references mentioning the vulnerability, setting a bit to 1 if a Bugtraq identifier exists, and assigning a numerical value to CVSS metrics.

* * * * *